(12) United States Patent
Means

(10) Patent No.: US 9,718,334 B2
(45) Date of Patent: Aug. 1, 2017

(54) ASSEMBLY AND METHOD FOR SUPPORTING AND LOCKING MOVABLE SOLAR PANELS

(71) Applicant: Kevin Paul Means, Lakeside, CA (US)

(72) Inventor: Kevin Paul Means, Lakeside, CA (US)

( * ) Notice: Subject to any disclaimer, the term of this patent is extended or adjusted under 35 U.S.C. 154(b) by 0 days.

(21) Appl. No.: 15/090,068

(22) Filed: Apr. 4, 2016

(65) Prior Publication Data

US 2016/0297287 A1     Oct. 13, 2016

Related U.S. Application Data

(60) Provisional application No. 62/145,317, filed on Apr. 9, 2015.

(51) Int. Cl.
    *B60J 7/16*         (2006.01)
(52) U.S. Cl.
    CPC .................................. *B60J 7/1642* (2013.01)
(58) Field of Classification Search
    CPC ..................................................... B60J 7/1642
    USPC ....... 296/211, 100, 4, 100.07; 224/301, 315, 224/321
    See application file for complete search history.

(56) References Cited

U.S. PATENT DOCUMENTS

| | | | |
|---|---|---|---|
| 948,737 A | 2/1910 | McKee et al. | |
| 3,990,277 A | 11/1976 | Mullich | |
| 4,789,197 A * | 12/1988 | Lewis | B60J 7/041 |
| | | | 296/100.04 |
| 4,891,908 A | 1/1990 | Aquilina | |
| 4,934,800 A | 6/1990 | Choi | |
| 5,350,213 A * | 9/1994 | Bernardo | B60J 7/041 |
| | | | 160/133 |
| 5,379,753 A | 1/1995 | Noennich | |
| 5,725,062 A | 3/1998 | Fronek | |
| 6,125,583 A | 10/2000 | Murray et al. | |
| 6,273,174 B1 | 8/2001 | Singleton | |
| 6,382,005 B1 | 5/2002 | White et al. | |

(Continued)

FOREIGN PATENT DOCUMENTS

| | | |
|---|---|---|
| EP | 2318625 B1 | 3/2013 |
| WO | WO2012079004 A1 | 6/2012 |

OTHER PUBLICATIONS

Go Power Adjustable RV rack for 55,80,110 RV Kits http://www.altestore.com/store/Solar-Panel-Mounts-Trackers/RV-Specialty-Solar-Panel-Mounts/Go-Power-Adjustable-RV-rack-for-5580110-RV-KITS/p597/?gclid=CLvxvdyNnsQCFQaTfgodKBsA1Q.

*Primary Examiner* — Dennis H Pedder
(74) *Attorney, Agent, or Firm* — Roeder & Broder LLP; James P. Broder

(57) ABSTRACT

A solar panel support assembly (12) for movably supporting a solar panel (10) relative to a surface (22) of a vehicle (624) comprises a fixed support member (14), a movable support member (16), and a locking assembly (20). The fixed support member (14) is fixedly coupled to the surface (22). The movable support member (16) is configured to retain the solar panel (10), the movable support member (16) being movably coupled to the fixed support member (14). The locking assembly (20) is movable between a locked position and an unlocked position. When the locking assembly (20) is in the locked position, the movable support member (16) is substantially inhibited from moving relative to the fixed support member (14). The solar panel support assembly (12) can further comprise a mover assembly (18) that moves the movable support member (16) relative to the fixed support member (14).

22 Claims, 6 Drawing Sheets

(56) References Cited

U.S. PATENT DOCUMENTS

| | | |
|---|---|---|
| 6,735,993 B2 | 5/2004 | Eller et al. |
| 6,968,654 B2 | 11/2005 | Moulder et al. |
| 7,025,394 B1 | 4/2006 | Hunt |
| 7,040,675 B1 * | 5/2006 | Ott ............................ B60J 7/19 292/123 |
| 7,406,800 B2 | 8/2008 | Cinnamon et al. |
| 7,476,832 B2 | 1/2009 | Vendig et al. |
| D652,789 S | 1/2012 | Kawai et al. |
| D658,120 S | 4/2012 | Kawai et al. |
| 8,225,458 B1 | 7/2012 | Hoffberg |
| 8,453,986 B2 | 6/2013 | Schnitzer |
| 8,464,496 B2 | 6/2013 | Cusson et al. |
| 8,601,752 B2 | 12/2013 | Prentice |
| 8,650,812 B2 | 2/2014 | Cusson |
| 8,707,949 B2 | 4/2014 | Hoffman |
| 8,763,321 B1 | 7/2014 | Clemens |
| 8,806,815 B1 | 8/2014 | Liu et al. |
| 8,839,573 B2 | 9/2014 | Cusson et al. |
| 8,839,575 B1 | 9/2014 | Liu et al. |
| 2005/0161073 A1 | 7/2005 | Head et al. |
| 2007/0051401 A1 | 3/2007 | Aaron |
| 2008/0100258 A1 | 5/2008 | Ward |
| 2009/0032100 A1 | 2/2009 | Oak |
| 2009/0165841 A1 * | 7/2009 | Gunn, Jr. .................... F24J 2/38 136/245 |
| 2010/0194884 A1 | 8/2010 | Plaster |
| 2010/0194885 A1 | 8/2010 | Plaster |
| 2011/0005512 A1 | 1/2011 | Ruesswick |
| 2011/0023863 A1 | 2/2011 | Andretich |
| 2011/0023864 A1 * | 2/2011 | Andretich .............. F24J 2/5264 126/570 |
| 2011/0197418 A1 | 8/2011 | Overturf et al. |
| 2011/0308575 A1 | 12/2011 | Guillemette |
| 2011/0314739 A1 * | 12/2011 | Kaburaki ................ E05F 15/63 49/70 |
| 2012/0175322 A1 | 7/2012 | Park et al. |
| 2012/0227786 A1 | 9/2012 | Hayashi et al. |
| 2012/0312947 A1 | 12/2012 | Shih et al. |
| 2013/0019921 A1 | 1/2013 | Au |
| 2013/0152717 A1 * | 6/2013 | Kopecek ................ B64C 13/28 74/89.39 |
| 2013/0153006 A1 | 6/2013 | Cox et al. |
| 2013/0186450 A1 | 7/2013 | Smith et al. |
| 2013/0206708 A1 * | 8/2013 | Lessard ..................... F24J 2/38 211/1.52 |
| 2013/0305518 A1 | 11/2013 | Adriani et al. |
| 2013/0319962 A1 | 12/2013 | Park et al. |
| 2013/0333688 A1 | 12/2013 | Ho et al. |
| 2013/0340810 A1 | 12/2013 | Danning |
| 2014/0028240 A1 | 1/2014 | Heumann et al. |
| 2014/0033511 A1 | 2/2014 | Swahn et al. |
| 2014/0069483 A1 | 3/2014 | Wolter et al. |
| 2014/0109953 A1 | 4/2014 | Aulich |
| 2014/0125068 A1 | 5/2014 | Hagenmeyer et al. |
| 2014/0174431 A9 | 6/2014 | Mackamul |
| 2014/0196761 A1 | 7/2014 | Tilley et al. |
| 2014/0251431 A1 | 9/2014 | West et al. |
| 2014/0261626 A1 | 9/2014 | Ripoll Agullo |
| 2014/0261637 A1 | 9/2014 | Okandan et al. |
| 2014/0283894 A1 | 9/2014 | Silver |
| 2014/0290715 A1 | 10/2014 | Meydbray |
| 2014/0360562 A1 | 12/2014 | Hartelius |
| 2015/0007871 A1 | 1/2015 | Durney et al. |

* cited by examiner

ASSEMBLY AND METHOD FOR SUPPORTING AND LOCKING MOVABLE SOLAR PANELS

RELATED APPLICATION

This application claims priority on Provisional Application Ser. No. 62/145,317 filed on Apr. 9, 2015, entitled "APPARATUS FOR REMOTELY TILTING, ROTATING AND LOCKING SOLAR PANELS ON RECREATIONAL VEHICLES". As far as is permitted, the contents of U.S. Provisional Application Ser. No. 62/145,317 are incorporated herein by reference.

BACKGROUND

As concerns continue to grow regarding climate change, the demand for clean, alternative, renewable sources of energy also continues to grow. One such renewable energy source is solar energy, i.e. the collection of the sun's rays that are then converted into electricity. Solar panels for the collection of the sun's rays are most often utilized when mounted on a surface in a fixed, non-moving position. However, increasing in popularity these days are various types of mounting systems for solar panels where the solar panels are movable to track the path or position of the sun in the sky throughout the day.

One current popular use for solar panels is to have the solar panels mounted on the rooftop of vehicles, such as recreational vehicles (RVs), motor homes, trailers, and the like, in order to help recharge the batteries of the vehicle. The solar panels are typically mounted on the roof of the vehicle for maximum exposure to the sun, i.e. such that the surface of the solar panel is directly facing the sun, as that is when the solar panels are able to most effectively and efficiently generate the desired electricity. However, during winter months, or in early mornings or late afternoons, the sun is relatively low on the horizon, and to get the most energy from the solar panels, the solar panels must be tilted, angled and/or rotated toward the sun. Typically, in order to move the solar panels as desired, it is necessary for someone to climb onto the roof of the vehicle in order to manually manipulate the position of the solar panels. Unfortunately, climbing onto the roof of the vehicle exposes the individual to the risk of falling, as well as to the possibility of damaging the roof or any roof-top mounted components such as air conditioners, vents, and antennae, as well as the solar panels themselves. Manually manipulating the solar panels can also be relatively time-consuming, because each panel may have multiple brackets that must be independently adjusted. Thus, it is desired to have an easy and convenient way to manipulate the position of the solar panels without having to climb onto the roof.

Another potential problem with solar panels being mounted on the rooftop of vehicles is how to best protect and secure the solar panels while the vehicle is moving and/or when the vehicle is subjected to harsh environmental elements, such a high winds. Thus, it is further desired to provide a means to protect and secure the solar panels during such conditions.

SUMMARY

The present invention is directed toward a solar panel support assembly for movably supporting a solar panel relative to a surface of a vehicle. In various embodiments, the solar panel support assembly comprises a fixed support member, a movable support member, and a locking assembly. The fixed support member is fixedly coupled to the surface. The movable support member is configured to retain the solar panel, the movable support member being movably coupled to the fixed support member. The locking assembly is movable between a locked position and an unlocked position. When the locking assembly is in the locked position, the movable support member is substantially inhibited from moving relative to the fixed support member.

In certain embodiments, the solar panel support assembly further comprises a mover assembly that moves the movable support member relative to the fixed support member between a first position and a second position. In some such embodiments, he locking assembly is only movable between the locked position and the unlocked position when the movable support member is in the first position relative to the fixed support member. Additionally, the mover assembly can be utilized to move the locking assembly between the locked position and the unlocked position.

In some embodiments, the movable support member includes a top edge, an opposed bottom edge, a first side edge, and an opposed second side edge. In such embodiments, when the movable support member is in the first position, a plurality of the top edge, the bottom edge, the first side edge and the second side edge of the movable support member are positioned substantially adjacent to the fixed support member; and when the movable support member is in the second position, substantially the entire top edge, first side edge and second side edge of the movable support member are spaced apart from the fixed support member.

The solar panel support assembly can further comprise a hinge that movably couples the movable support member to the fixed support member. In such embodiments, when the mover assembly moves the movable support member relative to the fixed support member, the mover assembly adjusts a tilt angle between the movable support member and the fixed support member between the first position and the second position. In some embodiments, the mover assembly includes a linear actuator that is coupled to the movable support member and the fixed support member.

Additionally, in certain embodiments, the solar panel support assembly further comprises a second mover assembly that rotates the movable support member relative to the fixed support member.

Further, the solar panel support assembly can further comprise a remote control device that wirelessly controls the mover assembly and the locking assembly.

In certain embodiments, the locking assembly includes a first locking component that is coupled to one of the fixed support member and the movable support member, and a second locking component that is formed within the other of the fixed support member and the movable support member. In some such embodiments, the first locking component includes a locking bar that is coupled to the movable support member, the locking bar having a first end and a second end, and the second locking component includes a pair of locking apertures formed within the fixed support member. In such embodiments, each of the first end and the second end of the locking bar extend through one of the locking apertures when the locking assembly is in the locked position.

Additionally, as provided herein, the solar panel support assembly can further comprise a mover assembly that moves the movable support member relative to the fixed support member between a first position and a second position. Further, the movable support member can include a top edge, an opposed bottom edge, a first side edge, an opposed second side edge, and an inner support bracket that is coupled to and extends between the top edge and the bottom edge between the first side edge and the second side edge. In some embodiments, the mover assembly includes a mover having a first mover end that is coupled to the fixed support member, and a second mover end that is coupled to the inner support bracket. Additionally, the inner support bracket can include a pair of spaced apart slotted apertures, and the locking bar can include a pair of side segments and a middle segment that extends between and connects to each of the side segments. In such embodiments, the second mover end can be coupled to the middle segment of the locking bar between the slotted apertures. Still further, in certain embodiments, the slotted apertures each include a first locking end and a second unlocking end; wherein when the locking assembly is in the locked position, the middle segment of the locking bar is at the first locking end of the slotted apertures; and wherein when the locking assembly is in the unlocked position, the middle segment of the locking bar is at the second unlocking end of the slotted apertures.

In certain applications, the present invention is also directed toward a solar panel support assembly for movably supporting a solar panel relative to a surface of a vehicle, the solar panel support assembly comprising (i) a fixed support member that is fixedly coupled to the surface; (ii) a movable support member that is configured to retain the solar panel, the movable support member being movably coupled to the fixed support member, the movable support member including a top edge, an opposed bottom edge, a first side edge, and an opposed second side edge; (iii) a mover assembly that moves the movable support member to adjust a tilt angle of the movable support member relative to the fixed support member between a first position and a second position, wherein when the movable support member is in the first position, a plurality of the top edge, the bottom edge, the first side edge and the second side edge of the movable support member are positioned substantially adjacent to the fixed support member; and wherein when the movable support member is in the second position, substantially the entire top edge, first side edge and second side edge of the movable support member are spaced apart from the fixed support member; and (iv) a locking assembly that is movable between a locked position and an unlocked position, the locking assembly including a first locking component that is coupled to one of the fixed support member and the movable support member, and a second locking component that is formed within the other of the fixed support member and the movable support member; wherein when the locking assembly is in the locked position, the movable support member is substantially inhibited from moving relative to the fixed support member to selectively adjust the tilt angle; and wherein the locking assembly is only movable between the locked position and the unlocked position when the movable support member is in the first position relative to the fixed support member.

Additionally, the present invention is further directed toward a method for movably supporting and locking a solar panel relative to a surface of a vehicle.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a solar panel support assembly for movably supporting and locking a solar panel relative to a surface of a vehicle. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
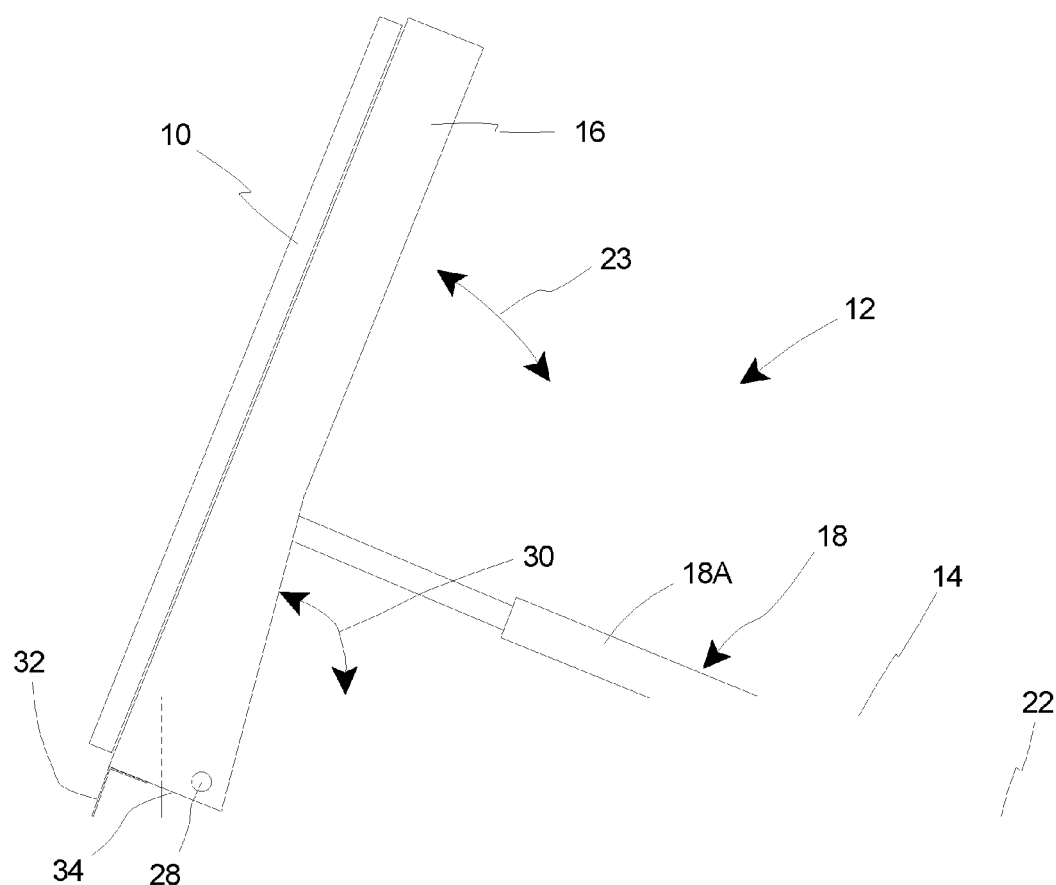
FIG. 1A is a simplified side view of a solar panel and an embodiment of a solar panel support assembly having features of the present invention, the solar panel support assembly being shown in an operational position.

FIG. 1A is a simplified side view of a solar panel 10 and an embodiment of a solar panel support assembly 12 (sometimes also referred to herein simply as a "support assembly") having features of the present invention that is supporting the solar panel 10.

It should be appreciated that the solar panel 10 can be of any suitable size and design for purposes of collecting the sun's rays and converting the sun's rays to electricity. For example, in certain embodiments, the solar panel 10 can be generally rectangular-shaped and can have a length of between approximately twenty-five inches and sixty inches and can have a width of between approximately fifteen inches and forty inches. Alternatively, the solar panel 10 can have a different shape and/or the solar panel 10 can have dimensions that are greater than or less than the dimensions specifically noted above.

Additionally, it should also be appreciated that the solar panel support assembly 12 can also be configured to support a solar panel array, i.e. a plurality of solar panels that are arranged in any suitable array pattern. As such, the term "solar panel" as utilized herein is intended to include a single solar panel as well as a solar panel array.

As provided herein, the design of the solar panel support assembly 12 can be varied to suit the requirements of the solar panel 10 (or solar panel array) that is being supported, and/or to suit the requirements for the amount of electricity that is desired to be produced. In various embodiments, as illustrated in FIG. 1A, the solar panel support assembly 12 includes a fixed support member 14, a movable support member 16 that retains the solar panel 10, a mover assembly 18, and a locking assembly 20 (illustrated mostly in phantom in FIG. 1B). Alternatively, the support assembly 12 can include more components or fewer components than what is illustrated and described in relation to FIG. 1A.

As an overview, the solar panel support assembly 12 is configured to movably support the solar panel 10 relative to a surface 22, e.g., a rooftop surface 622 (illustrated in FIG. 6) of a vehicle 624 (illustrated in FIG. 6), such as a recreational vehicle (RV), a motor home, a trailer, and the like. In particular, as described in detail herein, in certain embodiments, the support assembly 12 is configured such that the movable support member 16, and thus the solar panel 10, is movable (e.g., tiltable, rotatable, and/or elevatable) relative to the fixed support member 14 with the mover assembly 18 between a first (closed or non-operational) position (illustrated in FIG. 1B) and a second (operational) position (illustrated in FIG. 1A). It should be appreciated that, as discussed herein, the movable support member 16 can be alternatively positioned in a variety of second (operational) positions relative to the fixed support member 14, based on the type and extent of movement of the movable support member 16 relative to the fixed support member 14. Further, it should be recognized that when the movable support member 16 is in the second position relative to the fixed support member 14, at least a portion of the movable support member 16 is spaced apart from the fixed support member 14.

Additionally, the locking assembly 20 is configured such that the movable support member 16 and the solar panel 10 can be locked relative to the fixed support member 14 when the movable support member 16 is in the first position. More specifically, the locking assembly 20 can be moved between an unlocked position and a locked position, with such movements between the unlocked position and the locked position occurring when the movable support member 16 is in the first (closed or non-operational) position. With this design, when the movable support member 16 and the solar panel 10 are locked relative to the fixed support member 14, i.e. when the locking assembly 20 is in the locked position, the movable support member 16, and thus the solar panel 10, are substantially inhibited from moving, e.g., tilting, relative to the fixed support member 14. In certain embodiments, the movement of the locking assembly 20 between the unlocked position and the locked position can be accomplished through the use of the mover assembly 18. Alternatively, in other embodiments, such movement of the locking assembly 20 can be accomplished through use of a separate and distinct mover assembly.

Figure 6:
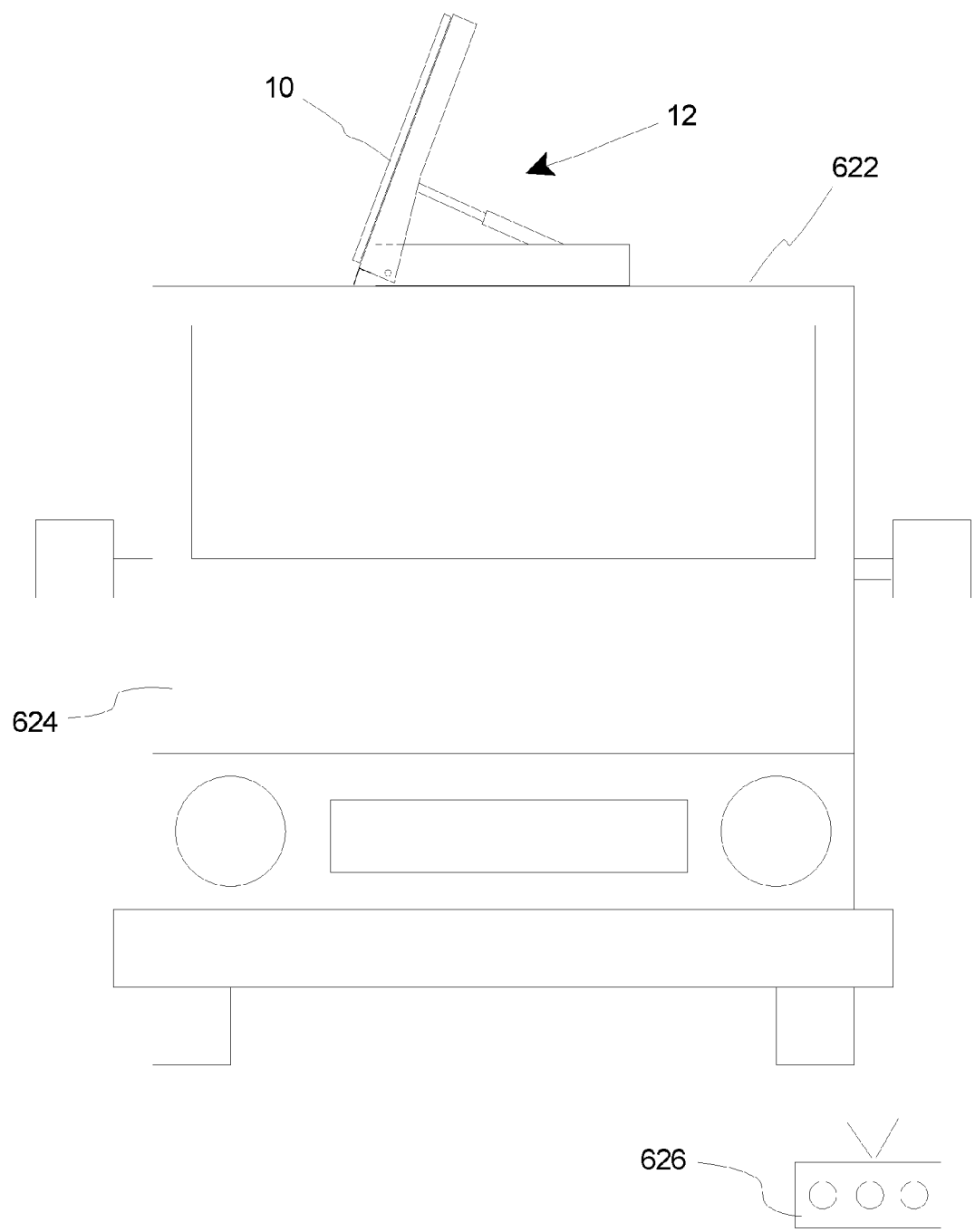
FIG. 6 is a simplified front view of a vehicle including a vehicle surface, and the solar panel and the solar panel support assembly illustrated in FIG. 1A.
Figure 1A:
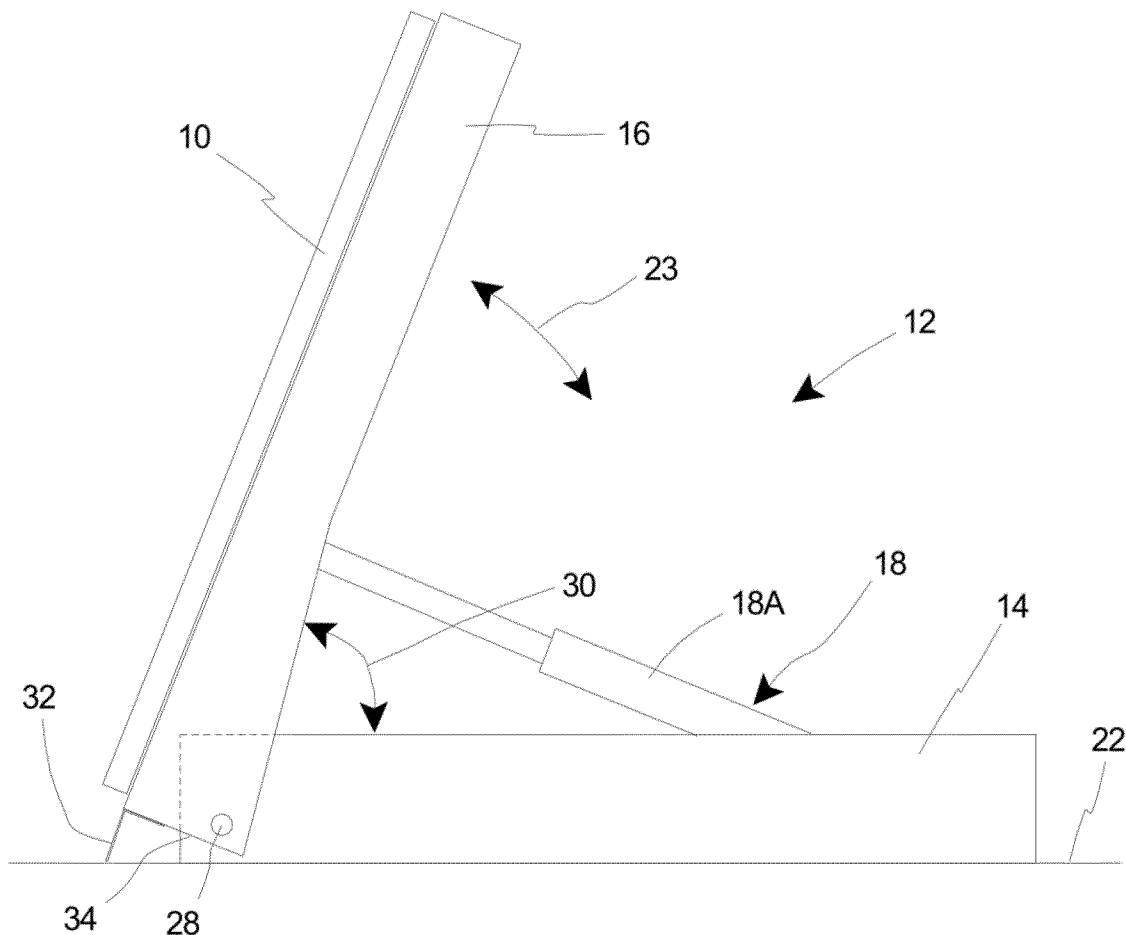
Figure 1B:
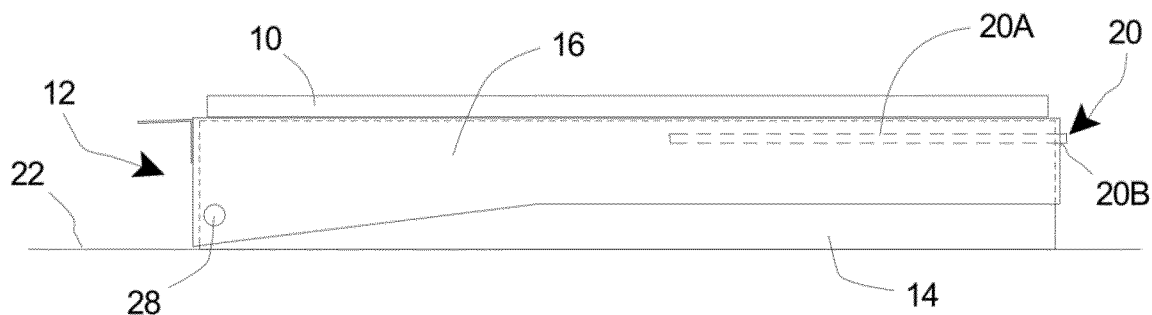
Figure 2:
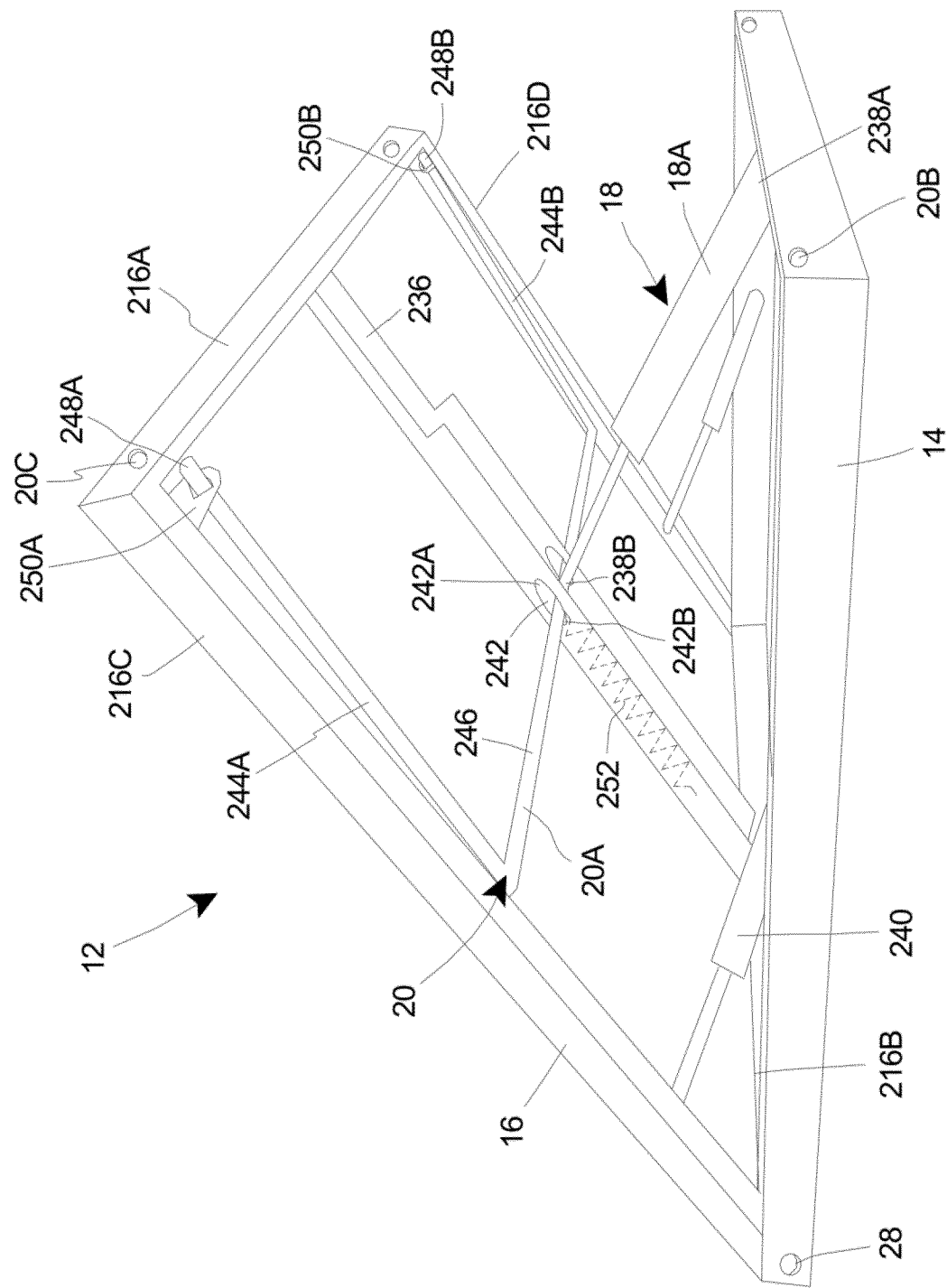
Figure 3:
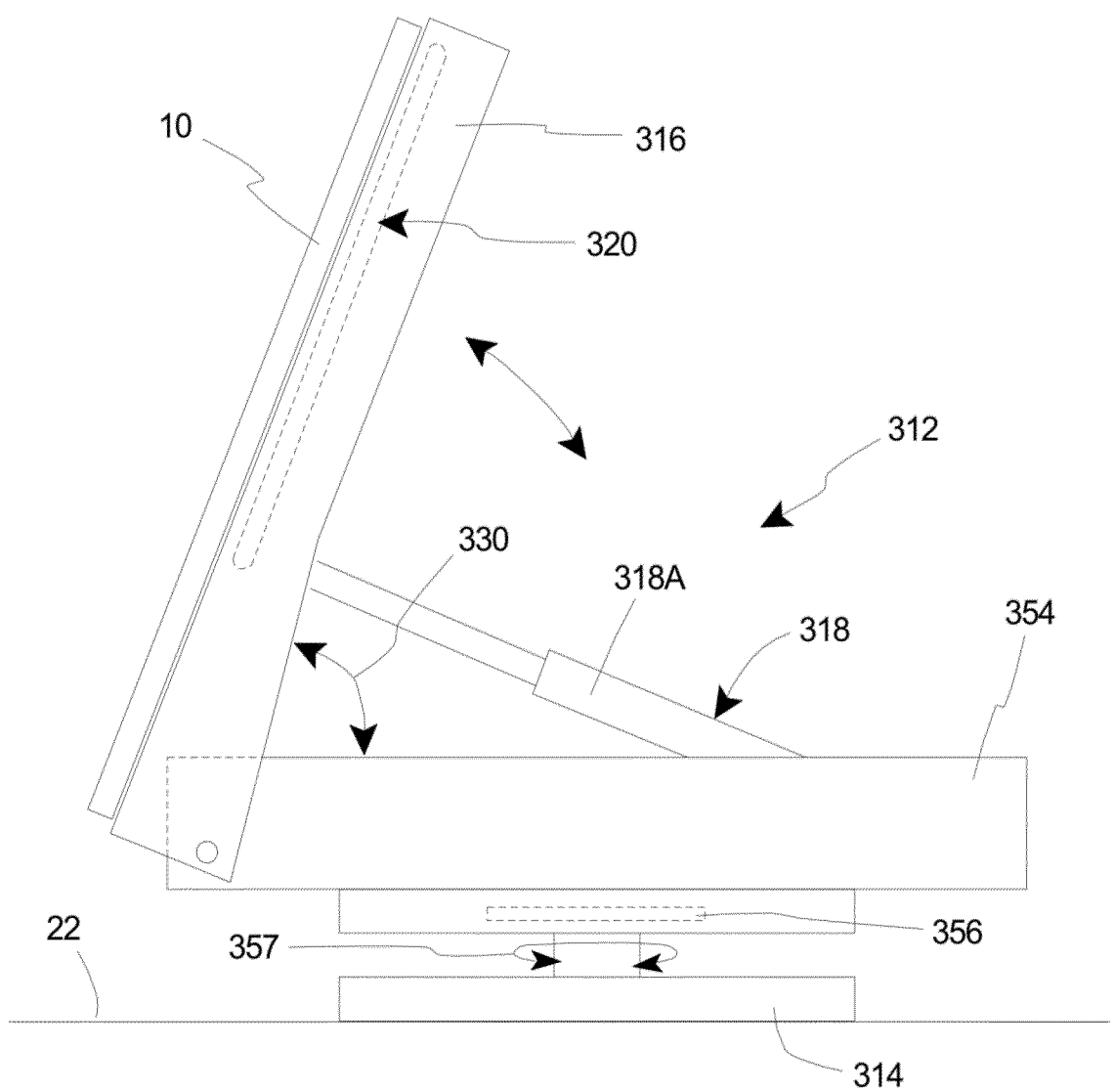
Figure 4:
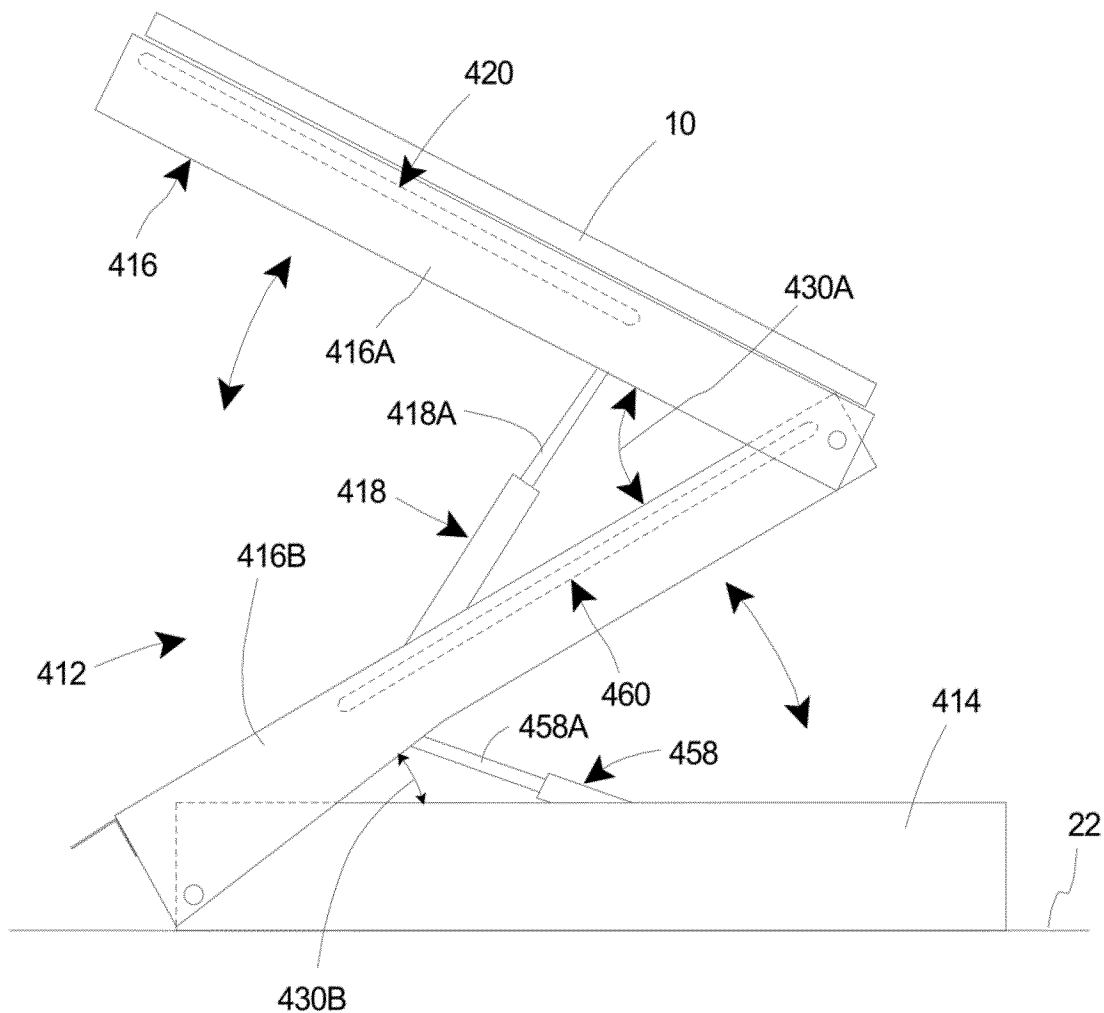
Figure 5:
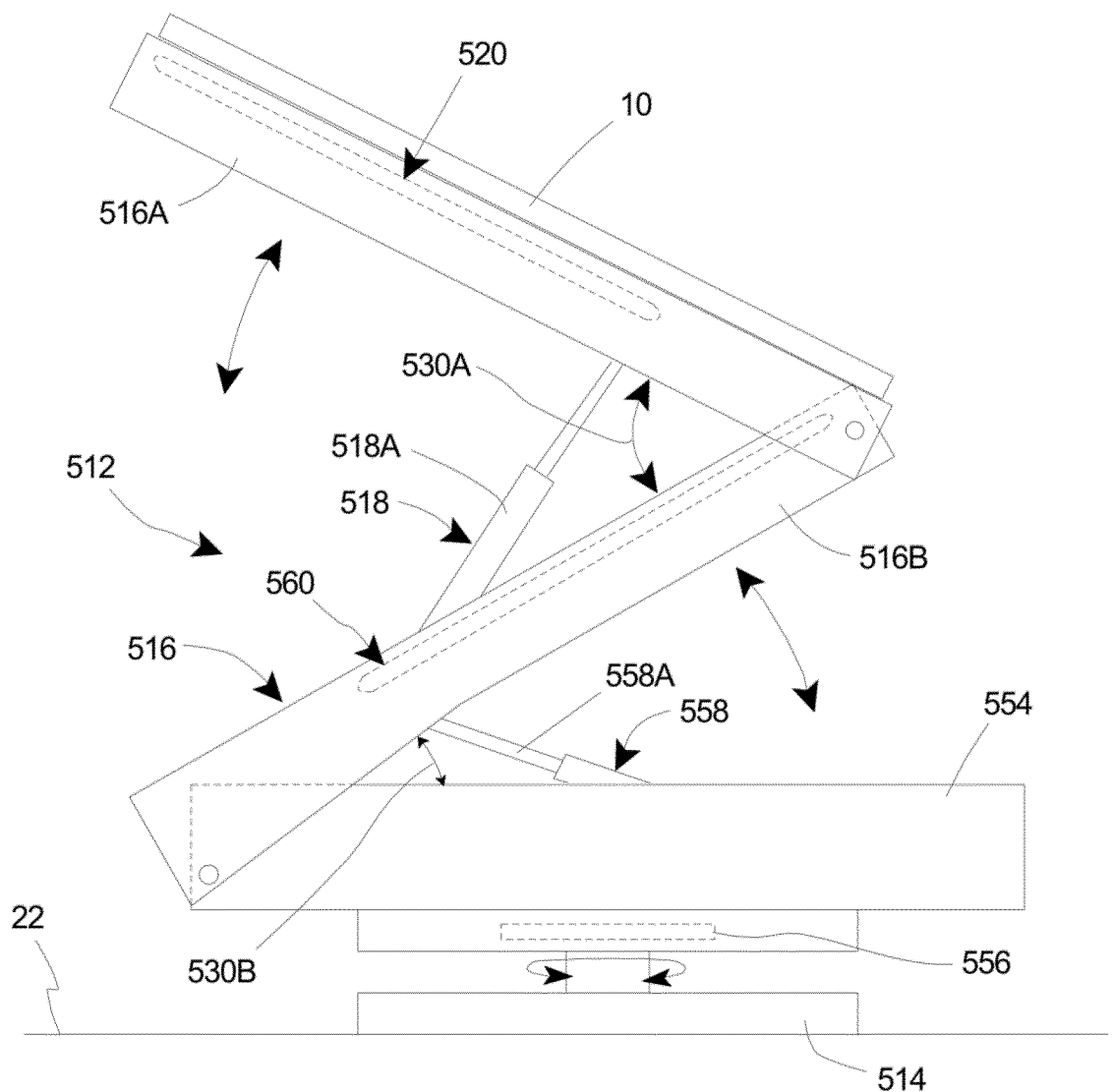
Figure 6:
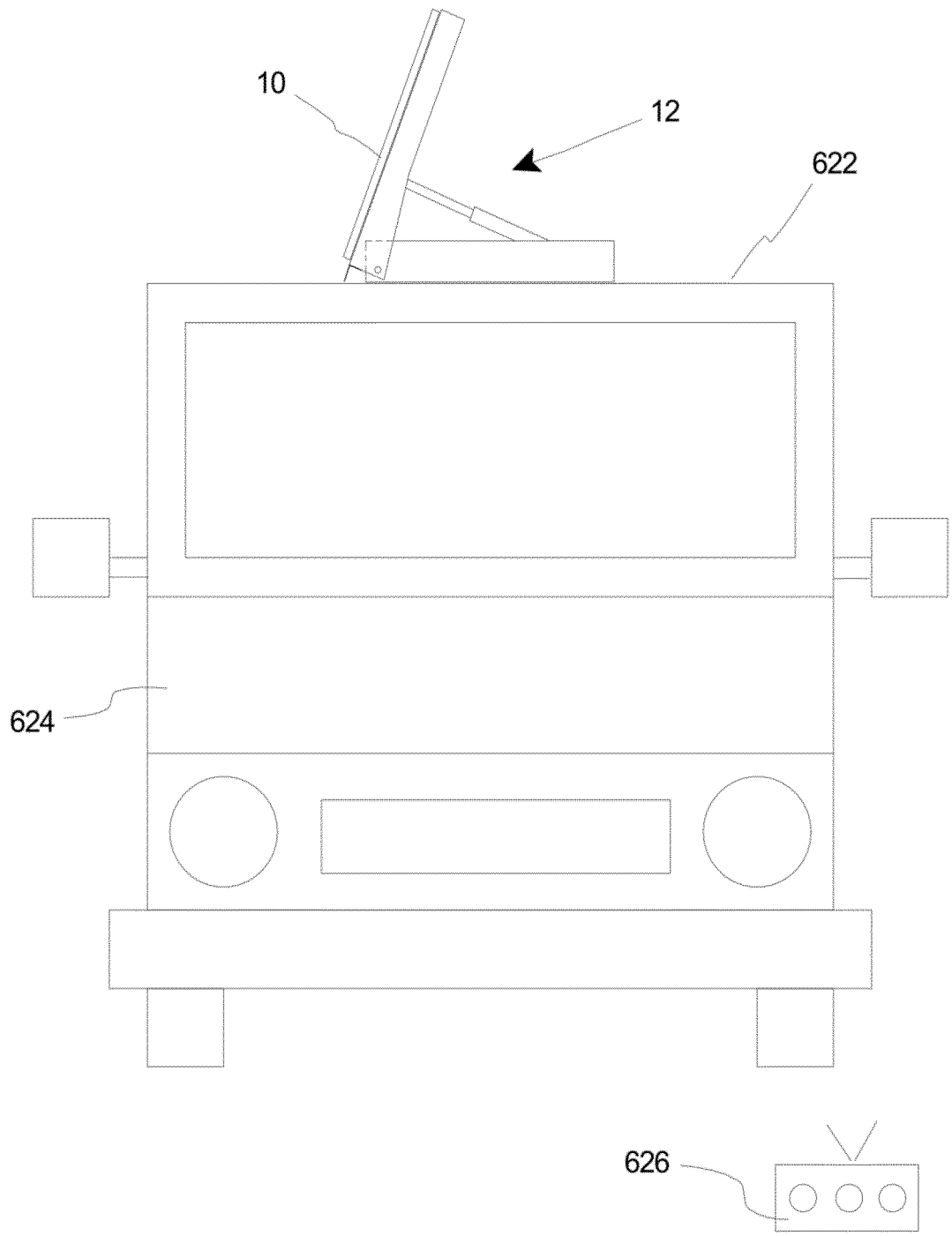

Further, in some embodiments, the movement of the movable support member 16 relative to the fixed support member 14, i.e. with the mover assembly 18, and the operation of the locking assembly 20 can be accomplished remotely by a user with a remote control device 626 (illustrated in FIG. 6). For example, in certain embodiments, the remote control device 626 can be utilized from within or outside the vehicle 624 to wirelessly operate and control the mover assembly 18 and the locking assembly 20. Thus, the remote control device 626 can obviate the need for the user to mount the rooftop surface 622 as a means to adjust the position of the solar panel 10 and/or to lock the position of the solar panel 10, which may be desired during movement of the vehicle 624 or when the vehicle is subjected to harsh environmental elements.

The fixed support member 14 is fixedly secured to the surface 22, e.g., to the rooftop surface 622 of the vehicle 624. The fixed support member 14 can have any suitable design. For example, in certain embodiments, the fixed support member 14 can be shaped like a shallow, rectangular box having an open top for receiving certain other components of the solar panel support assembly 12. Alternatively, the fixed support member 14 can have another suitable design. For example, in one non-exclusive alternative embodiment, the fixed support member 14 can be substantially rectangular frame-shaped.

It should be appreciated that the fixed support member 14 can be fixedly secured to the surface 22 in any suitable manner. For example, the fixed support member 14 can include a plurality of securing apertures (not shown) that are configured to receive fasteners (not shown), e.g., screws or bolts, that can be utilized to secure the fixed support member 14 to the surface 22. Alternatively, the fixed support member 14 can be welded to the surface 22. Still alternatively, the fixed support member 14 can be fixedly secured to the surface 22 in another suitable manner.

Additionally, the fixed support member 14 can be formed from any suitable materials. For example, in some non-exclusive alternative embodiments, the fixed support member 14 is formed from relatively lightweight metal materials such as aluminum. Alternatively, the fixed support member 14 can be formed from other suitable metals, metal alloys, composites, plastics and/or other non-metallic materials.

As noted above, the movable support member 16 is configured to retain the solar panel 10. Stated in another manner, the solar panel 10 can be removably secured to the movable support member 16. Additionally, the movable support member 16 can have any suitable design. For example, in certain non-exclusive alternative embodiments, the movable support member 16 can be substantially rectangular plate-shaped or the movable support member 16 can be substantially rectangular frame-shaped. Alternatively, the movable support member 16 can have a different design or a different shape.

Further, as provided herein, the movable support member 16 is movably (e.g., hingedly in this embodiment) coupled to the fixed support member 14, such that the position of the movable support member 16, and thus the solar panel 10, relative to the surface 22 can be selectively adjusted by the user. As illustrated in this embodiment, in certain applications, the movable support member 16 (and the solar panel 10) can be tilted relative to the fixed support member 14 and the surface 22 (such movement being illustrated by two-headed arrow 23), such that the solar panel 10 can be appropriately positioned to face the sun. With such design, the solar panel 10 can be selectively positioned to more effectively and efficiently collect the solar rays from the sun, thereby enabling the production of greater amounts of electrical energy.

Additionally and/or alternatively, in other embodiments, the solar panel support assembly 12 can be configured such that the movable support member 16 can be moved relative to the fixed support member 14 in other manners. For example, as described herein below, in some such alternative embodiments, the solar panel support assembly 12 can be configured such that the movable support member 16 can be rotated relative to the fixed support member 14. With such design, in the case of such a support assembly 12 being mounted on the rooftop surface 622 of a vehicle 624, the solar panels 10 can be positioned to face the sun regardless of how the vehicle 624 is positioned and/or oriented relative to the sun. Further, in other embodiments, the vertical position of the movable support member 16 can be selectively adjusted relative to the fixed support member 14, i.e. the movable support member 16 can be selectively elevatable relative to the fixed support member 14, to further enhance the variability of positioning of the movable support member 16 and thus the solar panels 10. Such ability to adjust the vertical positioning of the solar panel 10 can be of further value when it is desired to adjust the relative positioning of multiple solar panels, as the solar panels 10 can be positioned so as to not interfere with the movement of adjacent solar panels.

The means for movably coupling the movable support member 16 to the fixed support member 14 can be accomplished in any suitable manner. For example, as shown in FIG. 1A, the support assembly 12 can include a hinge 28 that directly movably couples the movable support member 16 to the fixed support member 14. The hinge 28 can have any suitable design and can be positioned in any suitable manner for purposes of movably coupling the movable support member 16 to the fixed support member 14. For example, as shown in FIG. 1A, the hinge 28 can be in the form of a pin or rod that extends through hinge apertures in each of the fixed support member 14 and the movable support member 16. Additionally and/or alternatively, the hinge 28 can be formed along and between an upper edge surface of the fixed support member 14 and an adjacent lower edge surface of the movable support member 16.

Additionally, the movable support member 16 can be formed from any suitable materials. For example, in some non-exclusive alternative embodiments, the movable support member 16 is formed from relatively lightweight metal materials such as aluminum. Alternatively, the movable support member 16 can be formed from other suitable metals, metal alloys, composites, plastics and/or other non-metallic materials.

The mover assembly 18 is configured to selectively move the movable support member 16 relative to the fixed support member 14 between the first position and the second position. Additionally, as provided herein, the mover assembly 18 can further move the locking assembly 20 between the locked position and the unlocked position.

The mover assembly 18 can have any suitable design. For example, as shown in FIG. 1A, the mover assembly 18 can include a mover 18A in the form of an electrically-powered linear actuator that is coupled at one end to the fixed support member 14 and coupled at the other end to the movable support member 16. With such design, the mover 18A can be selectively extended (e.g., with piston-like movement) so as to push/tilt the movable support member 16 relative to the fixed support member 14, and selectively retracted to pull the movable support member 16 back toward the fixed support member 14. Thus, as shown, the mover assembly 18 tilts the movable support member 16 relative to the fixed support member 14 so as to adjust a tilt angle 30 between the movable support member 16 and the fixed support member 14 between the first position and the second position. Alternatively, the mover assembly 18 can have a different design.

Additionally, a maximum of the tilt angle 30 for the movable support member 16 relative to the fixed support member 14 can be varied. For example, in some embodiments, the maximum tilt angle 30 for the movable support member 16 relative to the fixed support member 14 can be between approximately sixty degrees and eighty-five degrees. In certain non-exclusive such embodiments, the maximum tilt angle 30 can be approximately sixty degrees, sixty-five degrees, seventy degrees, seventy-five degrees, eighty degrees, or eight-five degrees. Alternatively, the maximum tilt angle 30 can be greater than eighty-five degrees or less than sixty degrees.

It should be appreciated that the mover assembly 18 can move (i.e. tilt) the movable support member 16 relative to the fixed support member 14 any desired angular amount between the first position and the maximum tilt angle 30. Stated in another manner, the tilt angle 30 of the movable support member 16 relative to the fixed support member 14 at any given time can be anywhere along the continuum between the first (closed or non-operational) position and the maximum tilt angle 30.

Further, as shown in FIG. 1A, in certain embodiments, the support assembly 12 can also include a tilt extent restrictor 32 that inhibits the movable support member 16 from tilting beyond the maximum tilt angle 30 relative to the fixed support member 14. In one such embodiment, the tilt extent restrictor 32 is substantially L-shaped and is positioned along an outer edge 34 of the movable support member 16. During use, when the movable support member 16 has reached the maximum tilt angle 30 relative to the fixed support member 14, the tilt extent restrictor 32 is positioned so as to contact or otherwise engage the surface 22. Such contact between the tilt extent restrictor 32 and the surface 22 serves to inhibit or restrict further tilting of the movable support member 16 relative to the fixed support member 14.

In certain embodiments, the overall size and shape of each of the fixed support member 14 and the movable support member 16 can be approximately the same as the size and shape of the solar panel 10 (or solar panel assembly). For example, in some such embodiments, each of the fixed support member 14 and the movable support member 16 can be substantially rectangle-shaped with a length of between approximately twenty-five inches and sixty inches and a width of between approximately fifteen inches and forty inches. Alternatively, the fixed support member 14 and/or the movable support member 16 can have dimensions that are greater than or less than those specifically noted above. Still alternatively, the fixed support member 14 and/or the movable support member 16 can have a different suitable shape.

It should be understood that having the size and shape of the support members 14,16 being approximately the same as the size and shape of the solar panel 10 provides certain advantages for the support assembly 12. For example, such restrictions enable the support assembly 12 to be more firmly mounted on the surface 22 so as to inhibit damage to the solar panel 10 and to inhibit movement of the solar panel 10 during movement of the vehicle 624 or during harsh environmental conditions.

Figure 1B:
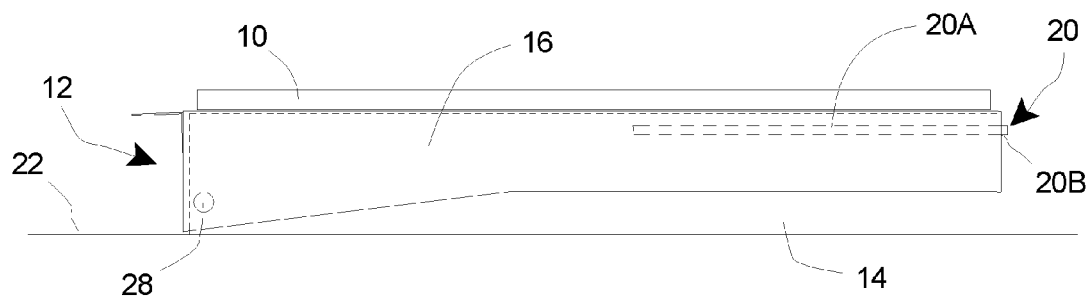
FIG. 1B is a simplified side view of the solar panel and the solar panel support assembly illustrated in FIG. 1A, the solar panel support assembly being shown in a non-operational position.

FIG. 1B is a simplified side view of the solar panel 10 and the solar panel support assembly 12 illustrated in FIG. 1A. As noted above, FIG. 1B illustrates the solar panel support assembly 12 with the movable support member 16 in the first (non-operational) position relative to the fixed support member 14, and with the locking assembly 20 in the locked position.

As illustrated, with the movable support member 16 in the first position, the movable support member 16 is positioned substantially adjacent to the fixed support member 14. In one embodiment, in such position, the movable support member 16 is substantially parallel to the fixed support member 14, and substantially parallel to the surface 22 to which the fixed support member 14 is secured. Alternatively, in another embodiment, when the movable support member 16 is in the first position, the movable support member 16 contacts the fixed support member 14 with the movable support member 16 still at a slight angle (e.g., between approximately zero degrees and five degrees) relative to the fixed support member 14.

Additionally, as noted above, FIG. 1B also illustrates the locking assembly 20 (illustrated mostly in phantom) that is selectively movable between the locked position and the unlocked position. It should be understood that the locking assembly 20 can only be moved to the locked position when the movable support member 16 is in the first position relative to the fixed support member 14.

As will be discussed in greater detail herein below, the locking assembly 20 can including a first locking component 20A (illustrated in phantom in FIG. 1B) and a second locking component 20B (illustrated more clearly in FIG. 2). In some embodiments, the first locking component 20A can be coupled to and/or formed within the movable support member 16, and the second locking component 20B can be coupled to and/or formed within the fixed support member 14. For example, in one such embodiment, the first locking component 20A can include a locking bar that is coupled to the movable support member 16, and the second locking component 20B can include one or more locking apertures (only one is visible in FIG. 1B) that extend through the fixed support member 14. As shown in FIG. 1B, the locking bar 20A extends through the locking aperture 20B when the locking assembly 20 is in the locked position. In such position, the movable support member 16 is inhibited from moving, i.e. tilting in this embodiment, relative to the fixed support member 14.

It should be appreciated that the use of the terms "first locking component" and "second locking component" is merely for convenience and ease of illustration, and either locking component 20A, 20B can be referred to as the "first locking component" and/or the "second locking component".

Figure 2:
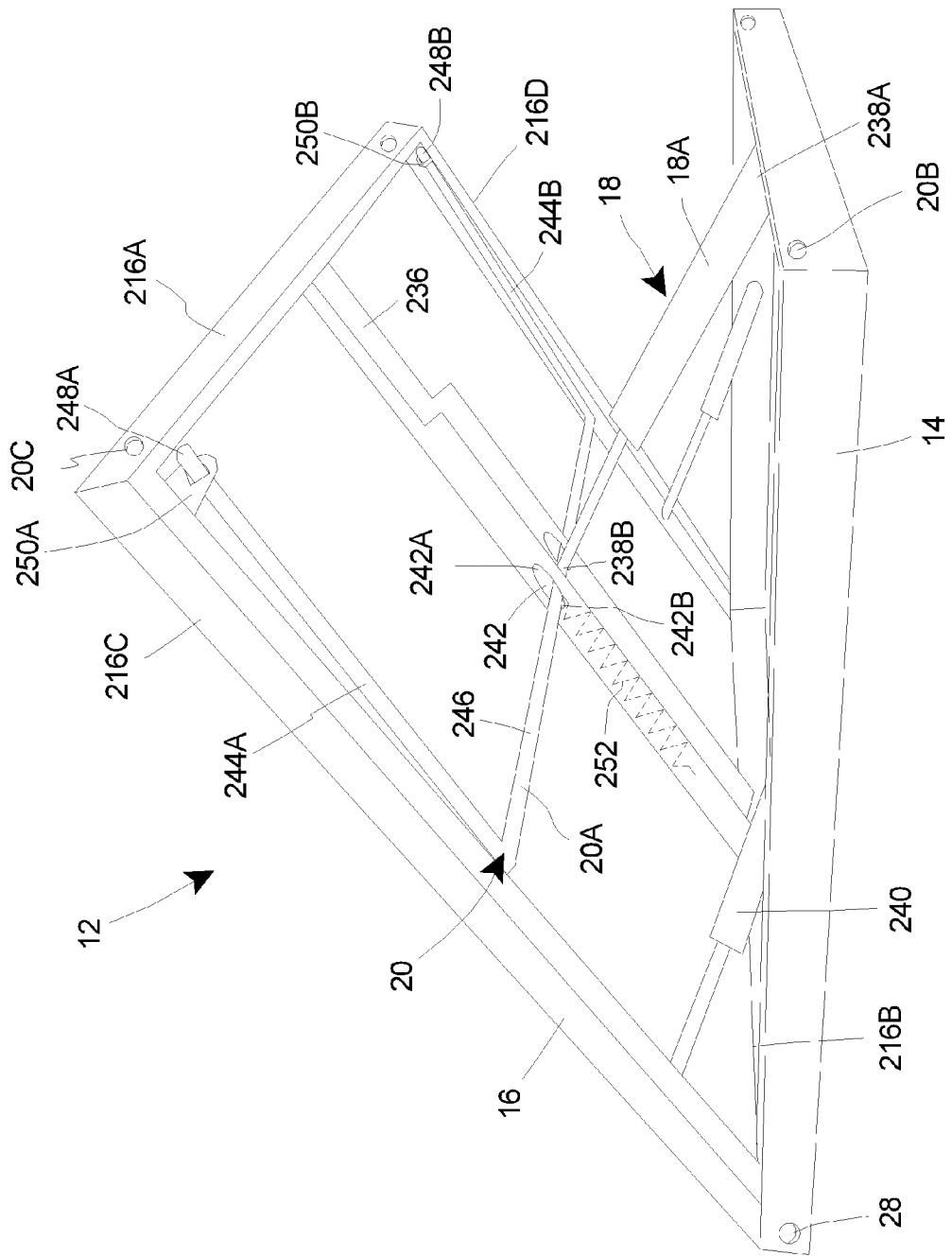
FIG. 2 is a perspective view of the solar panel support assembly illustrated in FIG. 1A.

FIG. 2 is a perspective view of the solar panel support assembly 12 illustrated in FIG. 1A. More specifically, FIG. 2 more clearly illustrates certain features and aspects of the fixed support member 14 and the movable support member 16, as well as more clearly illustrating various features and functions of the mover assembly 18 and the locking assembly 20.

As noted above, the fixed support member 14 can be substantially rectangular box-shaped or rectangular frame-shaped with an open top. Alternatively, the fixed support member 14 can have a different design.

Additionally, as illustrated in FIG. 2, in this embodiment, the movable support member 16 is substantially rectangular frame-shaped having a top edge 216A, an opposed bottom edge 216B, a first side edge 216C and an opposed second side edge 216D. Further, as shown, the movable support member 16 can include an inner (middle) support bracket 236 that is coupled to and extends between the top edge 216A and the bottom edge 216B approximately halfway between the first side edge 216C and the second side edge 216D. The inner support bracket 236 provides a means for coupling both the mover assembly 18, i.e. the mover 18A, and the locking assembly 20 to the movable support member 16.

As provided herein, when the movable support member 16 is in the first position, a plurality of the top edge 216A, the bottom edge 216B, the first side edge 216C and the second side edge 216D of the movable support member 16 are positioned substantially adjacent to the fixed support member 14. Conversely, when the movable support member 16 is in the second position, substantially the entire top edge 216A, first side edge 216C and second side edge 216D of the movable support member 16 are spaced apart from the fixed support member 14.

In certain embodiments, the mover assembly 18, as noted above, includes the mover 18A that is coupled to and extends between the fixed support member 14 and the movable support member 16. More specifically, the mover 18A includes a first mover end 238A that is coupled to the fixed support member 14, and a second mover end 238B that is coupled to the inner support bracket 36 of the movable support member 16.

Additionally, as illustrated in FIG. 2, the mover assembly 18 can further include a pair of stabilizers 240 that also are coupled to and extend between the fixed support member 14 and the movable support member 16. In particular, in this embodiment, one of the stabilizers is coupled to and extends between an inner surface of the fixed support member 14 and the first side edge 216C of the movable support member 16; and the other stabilizer 240 is coupled to and extends between an inner surface of the fixed support member 14 and the second side edge 216D of the movable support member 16. The stabilizers 240 can be utilized to assist the mover 18A in moving, i.e. tilting, the movable support member 16 relative to the fixed support member 14 from the first position to the second position, and to stabilize the movable support member 16 and the solar panel 10 when in the second position.

The locking assembly 20 can have any suitable design that enables the relative position between the movable support member 16 and the fixed support member 14 to be locked so as to inhibit relative movement, e.g., tilting in this embodiment, between the movable support member 16 and the fixed support member 14. As shown in the embodiment illustrated in FIG. 2, the locking assembly 20 includes the first locking component 20A in the form of a locking bar that is coupled to the movable support member 16, and the second locking component 20B in the form of a pair of locking apertures that extend through the fixed support member 14 that are configured to receive a portion of the locking bar 20A. It should be appreciated that in embodiments where the first position has the movable support member 16 substantially parallel to the fixed support member 14, the movable support member 16 can also include apertures 20C that are configured to receive a portion of the locking bar 20A as the locking assembly 20 is being moved to the locked position. Thus, with such design, a portion of the locking bar 20A can extend through such apertures 20C in the movable support member 16 as well as through the locking apertures 20B formed in the fixed support member 14 when the locking assembly 20 is in the locked position.

Alternatively, the locking assembly 20 can have a different design. For example, in one non-exclusive alternative embodiment, the locking apertures 20B need not extend all the way through the fixed support member 14, e.g., the second locking component 20B can be indentations formed in the fixed support member 14 that are configured to receive a portion of the locking bar 20A. Still alternatively, in another non-exclusive alternative embodiment, the first locking component 20A can include one or more locking nodes that extend away from an inner surface of the fixed support member 14, and the second locking component 20B can include one or more locking apertures (or indentations) formed in the movable support member 16 that are each configured to receive one of the locking nodes.

In this embodiment, the first locking component 20A, i.e. the locking bar, is substantially U-shaped having a pair of side segments 244A, 244B, and a middle segment 246 that extends between and connects to each of the side segments 244A, 244B. The middle segment 246 extends through a pair of spaced apart slotted apertures 242 formed in the inner support bracket 236 of the movable support member 16. Each of the side segments 244A, 244B cantilevers away from the middle segment 246, culminating in a first bar end 248A and a second bar end 248B, respectively. The first bar end 248A is further coupled to the movable support member 16 near the first side edge 216C and the top edge 216A with a first coupler 250A, e.g., a coupling bracket. Somewhat similarly, the second bar end 248B is further coupled to the movable support member 16 near the second side edge 216D and the top edge 216A with a second coupler 250B, e.g., a coupling bracket. The couplers 250A, 250B are configured to hold and position the first bar end 248A and the second bar end 248B, respectively, such that they can be easily moved through the locking apertures 20B when it is desired to move the locking assembly 20 from the unlocked position to the locked position.

During use, as shown, the second mover end 238B of the mover 18A can be coupled to the middle segment 246 of the locking bar 20A between the slotted apertures 242 in the inner support bracket 236. Initially, assume that the locking assembly 20 is in the locked position, with the bar ends 248A, 248B extending through the locking apertures 20B formed in the fixed support member 14. When it is desired to move the locking assembly 20 from the locked position to the unlocked position, and to move (e.g., tilt) the movable support member 16 relative to the fixed support member 14, power is applied to the mover 18A. As the mover 18A begins to extend, the initial movement is more horizontal than vertical. This horizontal movement results in a corresponding lateral movement of the locking bar 20A such that the bar ends 248A, 248B are pulled out of the corresponding locking apertures 20B. When a predetermined amount of lateral travel has been reached and the locking assembly has been moved to the unlocked position, the mover 18A continues to push on the locking bar 20A, which thus moves (tilts) the movable support member 16 relative to the fixed support member 14 as it pivots around the hinge 28.

It should be appreciated that the lateral movement of the locking bar 20A are limited and/or controlled by the dimensions of the slotted apertures 242 formed in the inner support bracket 236 through which the locking bar 20A passes. In particular, during the specific movement from the locked position to the unlocked position, the locking bar 20A moves within the slotted apertures 242 from a first locking end 242A to a second unlocking end 242B. Additionally, in this embodiment, the locking bar 20A is further held in place within the slotted apertures 242 by a resilient member 252 (illustrated in phantom), e.g., a spring, that is attached to and extends between the locking bar 20A and the inner support bracket 236. Further, it should also be appreciated that the tilting movement of the movable support member 16 relative to the fixed support member 14 can be stopped in any position between the first position and the maximum tilt angle 30 (illustrated in FIG. 1A).

Subsequently, it may be desired to move the movable support member 16 relative to the fixed support member 14 from the second position back to the first position, and then to move the locking assembly 20 from the unlocked position to the locked position. At such time, the same essential operations are applied, only in a reverse order. Reverse polarity is applied to the mover 18A such that the mover 18A begins to retract. The mover 18A continues to retract, thereby decreasing the tilt angle 30 between the movable support member 16 and the fixed support member 14 until the movable member is back to the first position, where the movable support member 16 is parallel or nearly parallel to the fixed support member 14. After the movable support member 16 has reached such a point, the mover 18A continues to retract, but in a more horizontal than vertical direction. Such movement pulls the bar ends 248A, 248B of the locking bar 20A back through the locking apertures 20B in the fixed support member 14 such that the locking assembly 20 is again in the locked position. Additionally, during the specific movement of the locking assembly 20 from the unlocked position to the locked position, the locking bar 20A moves within the slotted apertures 242 from the second unlocking end 242B to the first locking end 242A. With the locking assembly 20 back in the locked position, the solar panels 20 are again secure and protected from damage during travel and/or during harsh environmental conditions.

Figure 3:
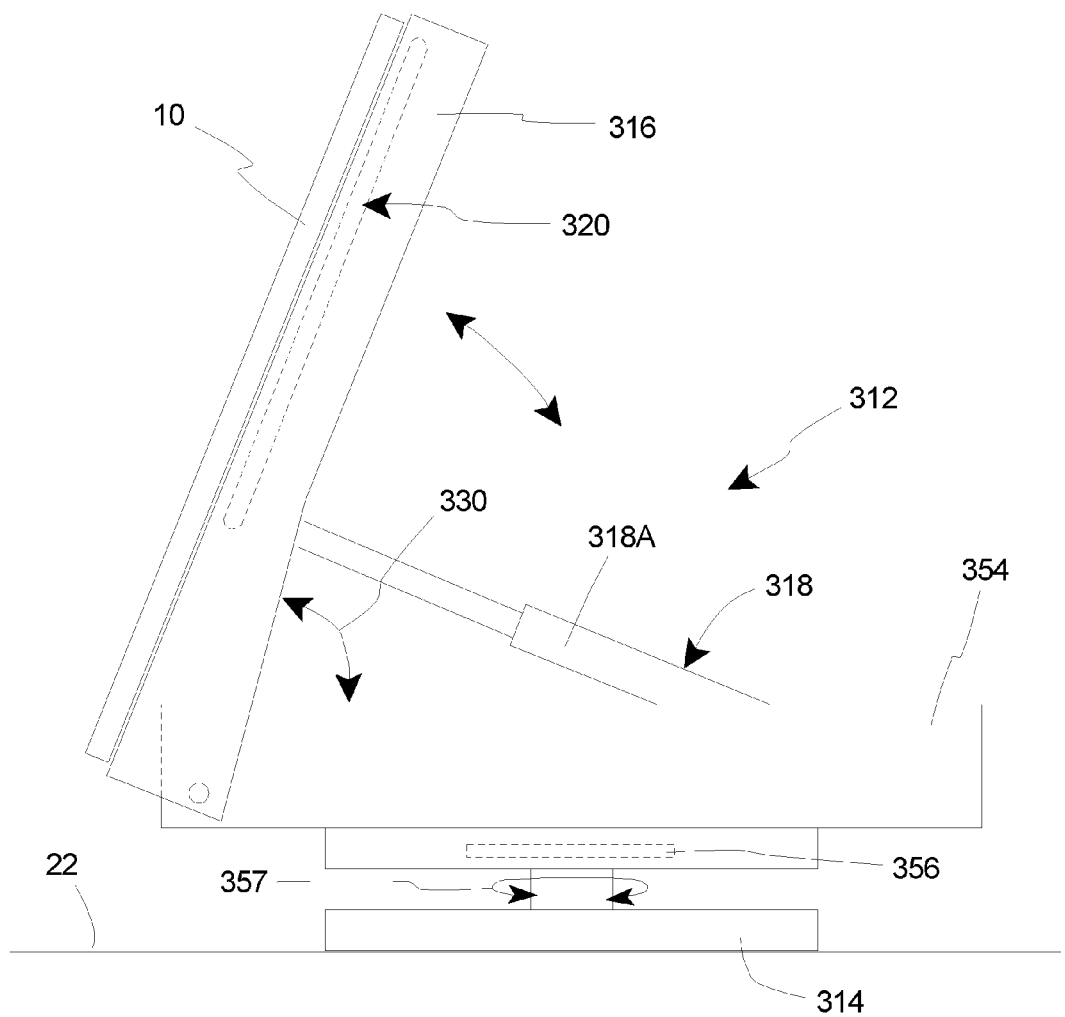
FIG. 3 is a simplified side view of the solar panel and another embodiment of the solar panel support assembly illustrated in FIG. 1A.

FIG. 3 is a simplified side view of the solar panel 10 and another embodiment of the solar panel support assembly 312 illustrated in FIG. 1A. As shown, the solar panel support assembly 312 is somewhat similar to the solar panel support assembly 12 illustrated and described above.

In this embodiment, the solar panel support assembly 312 includes a fixed support member 314, a movable support member 316, an intermediate support member 354, a first mover assembly 318, a second mover assembly 356, and a locking assembly 320 (illustrated in phantom).

As with the previous embodiment, the fixed support member 314 is fixedly secured to the surface 22, e.g., to the rooftop surface 622 (illustrated in FIG. 6) of the vehicle 624 (illustrated in FIG. 6). Additionally, the fixed support member 314 can again be substantially rectangular plate-shaped, rectangular frame-shaped, or another suitable shape.

As shown in FIG. 3, in this embodiment, the movable support member 316 is again configured to retain the solar panel 10. Additionally, as above, the movable support member 316 can again be substantially rectangular plate-shaped, rectangular frame-shaped, or another suitable shape.

However, in this embodiment, the movable support member 316 is indirectly coupled to the fixed support member 314, i.e. with the intermediate support member 354 positioned and/or coupled therebetween. In particular, as illustrated, the movable support member 316 is directly, movably (e.g., hingedly) coupled to the intermediate support member 354; and the intermediate support member 354 is movably (e.g., rotatably) coupled to the fixed support member 314. The selective movement of the movable support member 316 relative to the intermediate support member 354 is accomplished in a substantially similar manner to the selective movement of the movable support member 16 relative to the fixed support member 14 in the previous embodiment. More specifically, the first mover assembly 318 can include a first mover 318A in the form of an electrically-powered linear actuator that is coupled between the movable support member 316 and the intermediate support member 354. Thus, the first mover assembly 318, i.e. the first mover 318A, can be utilized to tilt the movable support member 316 relative to the intermediate support member 354 (and also relative to the fixed support member 314) so as to adjust a tilt angle 330 between the movable support member 316 and the intermediate support member 354. Additionally, the selective movement between the movable support member 316 and the intermediate support member 354 (and between the movable support member 316 and the fixed support member 314) can be identified as being between a first tilt position (i.e. a non-tilted position) and a second tilt position (i.e. a tilted position).

Additionally, the second mover assembly 356 is configured to selectively move the intermediate support member 354 relative to the fixed support member 314. The second mover assembly 356 can have any suitable design. For example, in some embodiments, the second mover assembly 356 can include a rotary motor that selectively rotates the intermediate support member 354 relative to the fixed support member 314, as illustrated by two-headed arrow 357. In one such embodiment, the second mover assembly 356 can have a "Lazy Susan" type design. Alternatively, the second mover assembly 356 can have another suitable design.

It should be recognized that with the coupling between the movable support member 316 and the intermediate support member 354, the selective rotation of the intermediate support member 354 relative to the fixed support member 314 also causes the movable support member 316 to selectively rotate relative to the fixed support member 314 between a first rotational position, i.e. a home position, and a second rotational position, i.e. a non-home position. It should be appreciated that the second rotational position can be anywhere along the rotational continuum away from the first rotational position.

The locking assembly 320 is coupled to each of the movable support member 316 and the intermediate support member 354. Additionally, the locking assembly 320 is again selectively movable between a locked position and an unlocked position. It should be understood that the locking assembly 320 can only be moved to the locked position when the movable support member 316 is in the first tilt position relative to the intermediate support member 354 and the fixed support member 314. The locking assembly 320 can have a design that is substantially similar to the design of the locking assembly 20 described in detail above. Accordingly, the locking assembly 320 will not be described again in detail.

In certain embodiments, the locking assembly 320 can be configured such that the locking assembly 320 can only be moved to the locked position when the intermediate support member 354 and the movable support member 316 are in the first rotational position relative to the fixed support member 314. Alternatively, in other embodiments, the locking assembly 320 can be configured such that the locking assembly 320 can be moved to the locked position regardless of the rotational position of the intermediate support member 354 and the movable support member 316 relative to the fixed support member 314.

Figure 4:
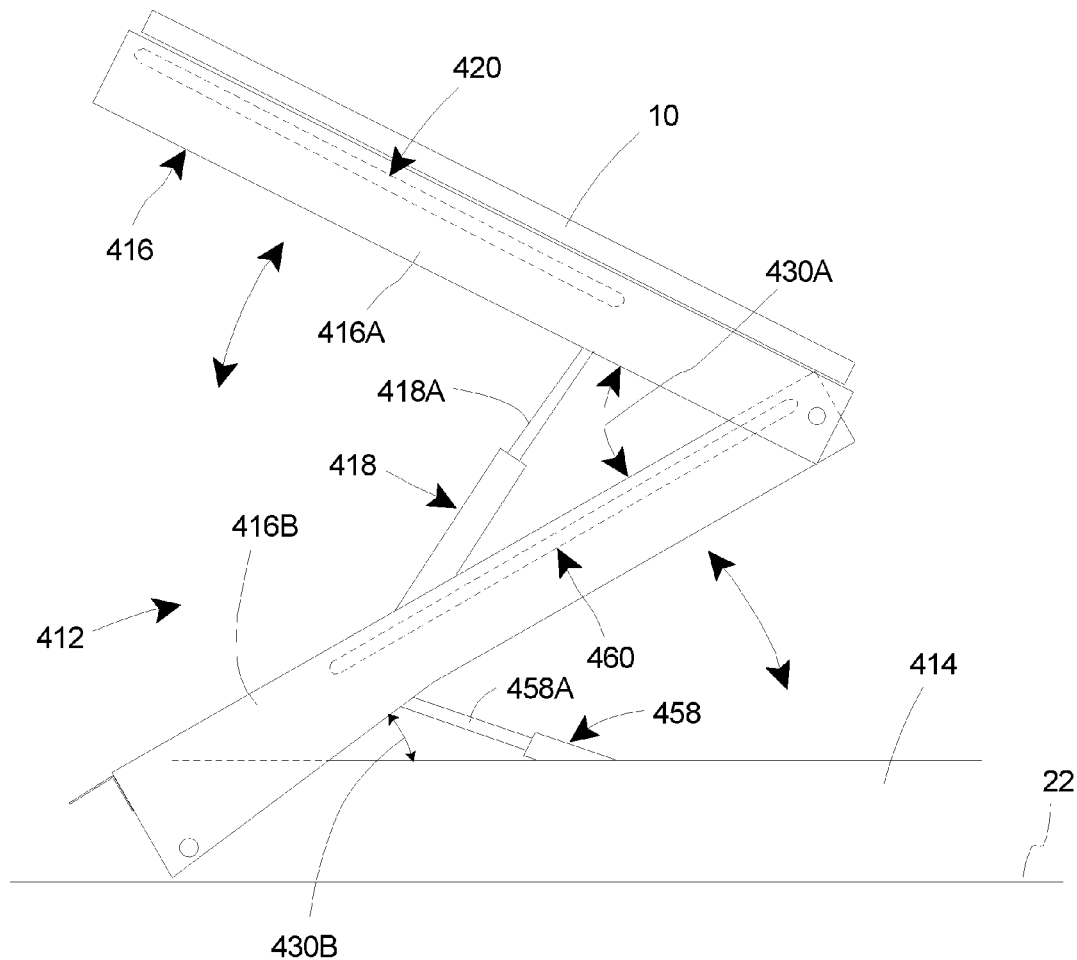
FIG. 4 is a simplified side view of the solar panel and still another embodiment of the solar panel support assembly illustrated in FIG. 1A.

FIG. 4 is a simplified side view of the solar panel 10 and still another embodiment of the solar panel support assembly 412 illustrated in FIG. 1A. As shown, the solar panel support assembly 412 is somewhat similar to the solar panel support assembly 12 illustrated and described above.

In this embodiment, the solar panel support assembly 412 includes a fixed support member 414, a movable support assembly 416 including a first movable support member 416A and a second movable support member 416B, a first mover assembly 418, a second mover assembly 458, a first locking assembly 420 (illustrated in phantom), and a second locking assembly 460 (illustrated in phantom).

As with the previous embodiments, the fixed support member 414 is fixedly secured to the surface 22, e.g., the rooftop surface 622 (illustrated in FIG. 6) of the vehicle 624 (illustrated in FIG. 6). Additionally, the fixed support member 414 can again be substantially rectangular plate-shaped, rectangular frame-shaped, or another suitable shape.

However, in this embodiment, the movable support member 16 (illustrated in FIG. 1A) has been replaced by the movable support assembly 416 that includes the first movable support member 416A and the second movable support member 416B. Each of the first movable support member 416A and the second movable support member 416B can be substantially rectangular plate-shaped, rectangular frame-shaped, or another suitable shape.

As shown in FIG. 4, the first movable support member 416A is configured to retain the solar panel 10. Additionally, the first movable support member 416A is movably (e.g., hingedly) coupled to the second movable support member 416B, and the second movable support member 416B is movably (e.g., hingedly) coupled to the fixed support member 414.

The selective movement of the first movable support member 416A relative to the second movable support member 416B is accomplished in a substantially similar manner to the selective movement of the movable support member 16 relative to the fixed support member 14 as described above. More specifically, the first mover assembly 418 can include a first mover 418A in the form of an electrically-powered linear actuator that is coupled between the first movable support member 416A and the second movable support member 416B. Thus, the first mover assembly 418, i.e. the first mover 418A, can be utilized to tilt the first movable support member 416A relative to the second movable support member 416B (and also relative to the fixed support member 414) so as to adjust a first tilt angle 430A between the first movable support member 416A and the second movable support member 416B. The first movable support member 416A is selectively movable relative to the second movable support member 416B between a first closed position (wherein the first tilt angle 430A is at or very near zero degrees) and a first open position (wherein the first tilt angle 430A is anywhere between the first closed position and a maximum first tilt angle 430A).

Additionally, the selective movement of the second movable support member 416B relative to the fixed support member 414 is accomplished in a substantially similar manner to the selective movement of the movable support member 16 relative to the fixed support member 14 as described above. More specifically, the second mover assembly 458 can include a second mover 458A in the form of an electrically-powered linear actuator that is coupled between the second movable support member 416B and the fixed support member 414. Thus, the second mover assembly 458, i.e. the second mover 458A, can be utilized to tilt the second movable support member 416B relative to the fixed support member 414 so as to adjust a second tilt angle 430B between the second movable support member 416B and the fixed support member 414. The second movable support member 416B is selectively movable relative to the fixed support member 414 between a second closed position (wherein the second tilt angle 430B is at or very near zero degrees) and a second open position (wherein the second tilt angle 430B is anywhere between the second closed position and a maximum second tilt angle 430B).

It should be appreciated that by being able to selectively adjust both the first tilt angle 430A and the second tilt angle 430B, the possibilities for the angular position of the solar panel 10 can be greatly increased. For example, with such design, the position of the solar panel 10 can be selected adjusted to alternatively face in opposite directions, e.g., toward opposite sides of the vehicle 624.

The first locking assembly 420 and the second locking assembly 460 can have a design that is substantially similar to the design of the locking assembly 20 described in detail above. Accordingly, the full design of the locking assemblies 420, 460 will not be described in detail herein.

In this embodiment, the first locking assembly 420 is coupled to the first movable support member 416A and the second movable support member 416B. Additionally, the first locking assembly 420 is selectively movable between a first locked position and a first unlocked position. When the first locking assembly 420 is in the first locked position, the first mover assembly 418 is inhibited from moving, e.g., tilting, the first movable support member 416A relative to the second movable support member 416B. It should be appreciated that the first locking assembly 420 is only movable to the first locked position when the first movable support member 416A is in the first closed position relative to the second movable support member 416B.

Additionally, in this embodiment, the second locking assembly 460 is coupled to the second movable support member 416B and the fixed support member 414. Additionally, the second locking assembly 460 is selectively movable between a second locked position and a second unlocked position. When the second locking assembly 420 is in the second locked position, the second mover assembly 458 is inhibited from moving, e.g., tilting, the second movable support member 416B relative to the fixed support member 414. It should be appreciated that the second locking assembly 460 is only movable to the second locked position when the second movable support member 416B is in the second closed position relative to the fixed support member 414.

Figure 5:
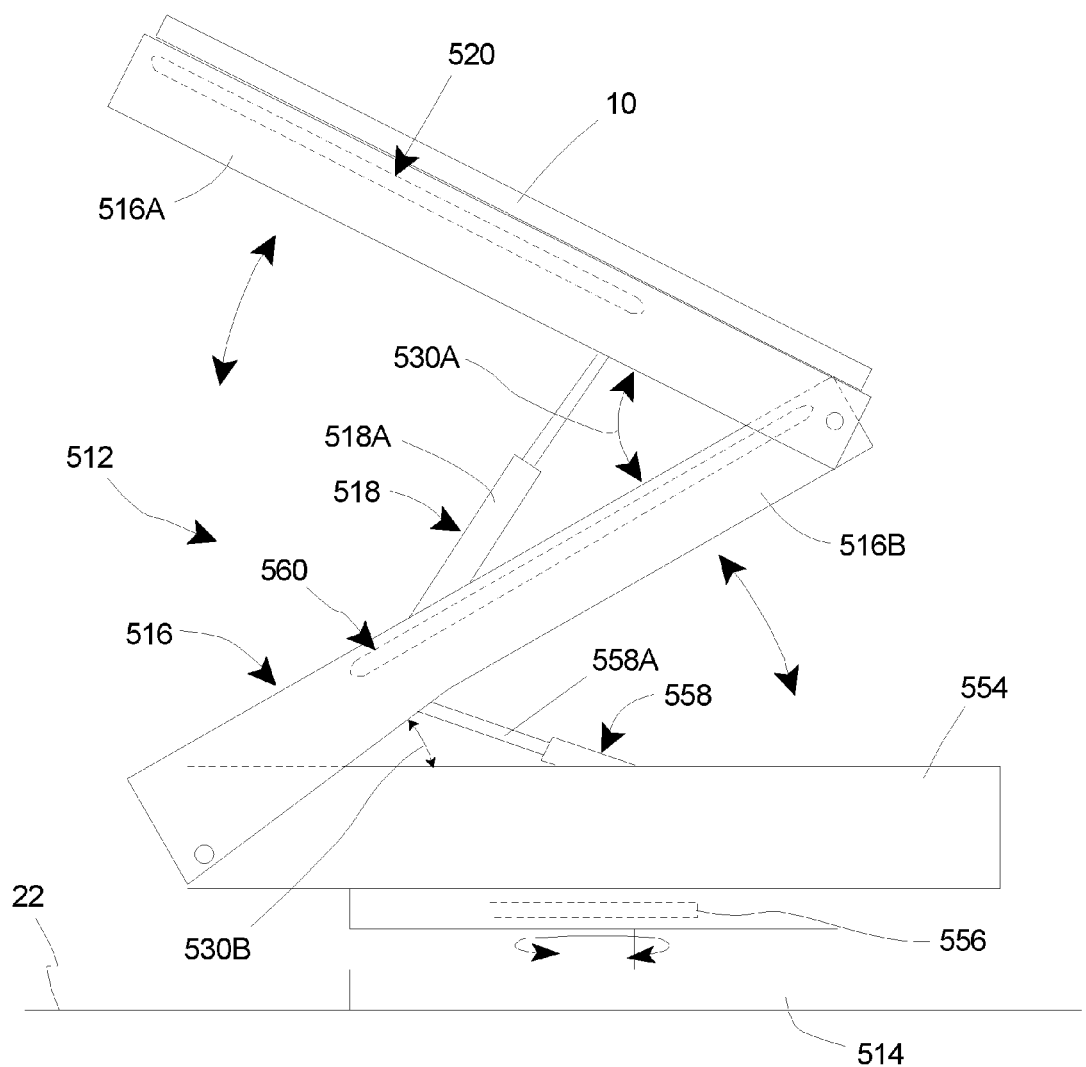
FIG. 5 is a simplified side view of the solar panel and yet another embodiment of the solar panel support assembly illustrated in FIG. 1A.

FIG. 5 is a simplified side view of the solar panel 10 and yet another embodiment of the solar panel support assembly 512 illustrated in FIG. 1A. As shown, the solar panel support assembly 512 is somewhat similar to the solar panel support assemblies 12, 312, 412 illustrated and described above. More particularly, in this embodiment, the solar panel support assembly 512 combines the features as illustrated and described above in relation to the solar panel support assembly 312 illustrated in FIG. 3 and the solar panel support assembly illustrated in FIG. 4. As such, all of the features and aspects of each of the components of the solar panel support assembly 512 will not be described in detail herein.

In this embodiment, the solar panel support assembly 512 includes a fixed support member 514, a movable support assembly 516 including a first movable support member 516A and a second movable support member 516B, an intermediate support member 554, a first mover assembly 518 including a first mover 518A, a second mover assembly 558 including a second mover 558A, a third mover assembly 556 (illustrated in phantom), a first locking assembly 520 (illustrated in phantom), and a second locking assembly 560 (illustrated in phantom).

As with the previous embodiments, the fixed support member 514 is fixedly secured to the surface 22, e.g., the rooftop surface 622 (illustrated in FIG. 6) of the vehicle 624 (illustrated in FIG. 6). Additionally, the fixed support member 514 can again be substantially rectangular plate-shaped, rectangular frame-shaped, or another suitable shape.

The first mover assembly 518, i.e. the first mover 518A, can be utilized to tilt the first movable support member 516A relative to the second movable support member 516B (and also relative to the fixed support member 514) so as to adjust a first tilt angle 530A between the first movable support member 516A and the second movable support member 516B.

Somewhat similarly, the second mover assembly 558, i.e. the second mover 558A, can be utilized to tilt the second movable support member 516B relative to the intermediate support member 554 so as to adjust a second tilt angle 530B between the second movable support member 516B and the intermediate support member 514.

Additionally, the third mover assembly 556 can include a rotary motor that selectively rotates the intermediate support member 554 relative to the fixed support member 514.

In this embodiment, the first locking assembly 520 is coupled to the first movable support member 516A and the second movable support member 516B. Additionally, the first locking assembly 520 is selectively movable between a first locked position and a first unlocked position. When the first locking assembly 520 is in the first locked position, the first mover assembly 518 is inhibited from moving, e.g., tilting, the first movable support member 516A relative to the second movable support member 516B. It should be appreciated that the first locking assembly 520 is only movable to the first locked position when the first movable support member 516A is in a first closed position relative to the second movable support member 516B.

Additionally, in this embodiment, the second locking assembly 560 is coupled to the second movable support member 516B and the intermediate support member 554. Additionally, the second locking assembly 560 is selectively movable between a second locked position and a second unlocked position. When the second locking assembly 520 is in the second locked position, the second mover assembly 558 is inhibited from moving, e.g., tilting, the second movable support member 516B relative to the intermediate support member 554, and thus relative to the fixed support member 514. It should be appreciated that the second locking assembly 560 is only movable to the second locked position when the second movable support member 516B is in a second closed position relative to the intermediate support member 554.

Further, in certain embodiments, the locking assemblies 520, 560 can be configured such that the locking assemblies 520, 560 can only be moved to the locked positions when the intermediate support member 554 and the movable support assembly 516 are in a first rotational position relative to the fixed support member 514. Alternatively, in other embodiments, the locking assemblies 520, 560 can be configured such that the locking assemblies 520, 560 can be moved to the locked positions regardless of the rotational position of the intermediate support member 554 and the movable support assembly 516 relative to the fixed support member 514.

FIG. 6 is a simplified front view of a vehicle 624 including a vehicle surface 622, and the solar panel 10 and the solar panel support assembly 12 illustrated in FIG. 1A. As shown, the solar panel support assembly 12, which retains the solar panel 10, is mounted on the rooftop surface 622 of the vehicle 624. Additionally, FIG. 6 also illustrates the remote control device 626 that can be utilized to operate and control any of the mover assemblies and the locking assemblies.

It is understood that although a number of different embodiments of the solar panel support assembly 12 have been illustrated and described herein, one or more features of any one embodiment can be combined with one or more features of one or more of the other embodiments, provided that such combination satisfies the intent of the present invention.

While a number of exemplary aspects and embodiments of the solar panel support assembly 12 have been shown and disclosed herein above, those of skill in the art will recognize certain modifications, permutations, additions and sub-combinations thereof. It is therefore intended that the solar panel support assembly 12 shall be interpreted to include all such modifications, permutations, additions and sub-combinations as are within their true spirit and scope, and no limitations are intended to the details of construction or design herein shown.

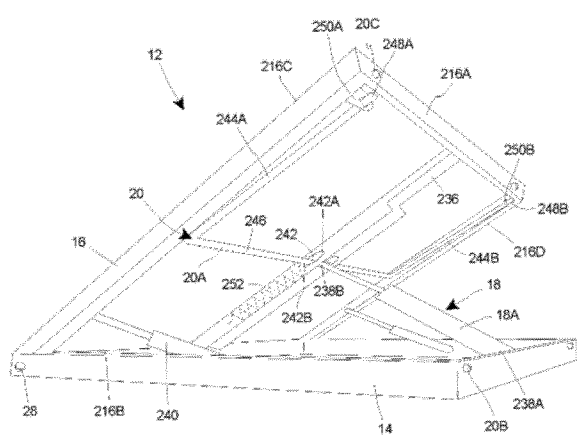
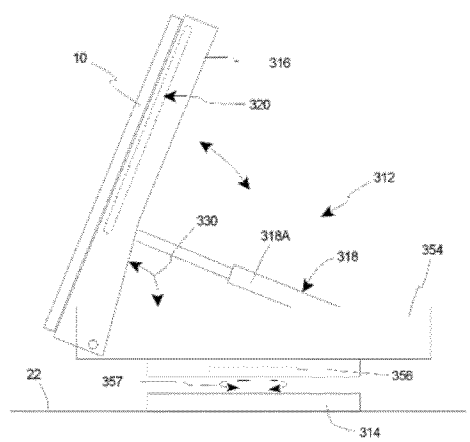

What is claimed is:

1. A solar panel support assembly for movably supporting a solar panel relative to a surface of a vehicle, the solar panel support assembly comprising:
   a fixed support member that is fixedly coupled to the surface;
   a movable support member that is configured to retain the solar panel, the movable support member being movably coupled to the fixed support member, the movable support member including a top edge, an opposed bottom edge, a first side edge, an opposed second side edge, and an inner support bracket that is coupled to and extends between the top edge and the bottom edge between the first side edge and the second side edge, wherein the inner support bracket includes a pair of spaced apart slotted apertures;
   a locking assembly that is movable between a locked position and an unlocked position, wherein when the locking assembly is in the locked position, the movable support member is substantially inhibited from moving relative to the fixed support member, the locking assembly including (i) a first locking component that includes a locking bar that is coupled to the movable support member, the locking bar having a first end, a second end, a pair of side segments, and a middle segment that extend between and connects to each of the side segments, and (ii) a second locking component that includes a pair of locking apertures formed within the fixed support member, and wherein each of the first end and the second end of the locking bar extend through one of the locking apertures when the locking assembly is in the locked position; and
   a mover assembly that moves the movable support member relative to the fixed support member between a first position and a second position, wherein the mover assembly includes a mover having a first mover end that is coupled to the fixed support member, and a second mover end that is coupled to the inner support bracket, and wherein the second mover end is coupled to the middle segment of the locking bar between the slotted apertures.

2. The solar panel support assembly of claim 1 wherein the slotted apertures each include a first locking end and a second unlocking end; wherein when the locking assembly is in the locked position, the middle segment of the locking bar is at the first locking end of the slotted apertures; and wherein when the locking assembly is in the unlocked position, the middle segment of the locking bar is at the second unlocking end of the slotted apertures.

3. A solar panel support assembly for movably supporting a solar panel relative to a surface of a vehicle, the solar panel support assembly comprising:
   a fixed support member that is fixedly coupled to the surface;
   a movable support member that is configured to retain the solar panel, the movable support member being movably coupled to the fixed support member, the movable support member including a top edge, an opposed bottom edge, a first side edge, an opposed second side edge, and an inner support bracket that is coupled to and extends between the top edge and the bottom edge between the first side edge and the second side edge, wherein the inner support bracket includes a pair of spaced apart slotted apertures;
   a mover assembly that moves the movable support member to adjust a tilt angle of the movable support member relative to the fixed support member between a first position and a second position, wherein when the movable support member is in the first position, a plurality of the top edge, the bottom edge, the first side edge and the second side edge of the movable support member are positioned substantially adjacent to the fixed support member; and wherein when the movable support member is in the second position, substantially the entire top edge, first side edge and second side edge of the movable support member are spaced apart from the fixed support member, and wherein the mover assembly includes a mover having a first mover end that is coupled to the fixed support member, and a second mover end that is coupled to the inner support bracket; and
   a locking assembly that is movable between a locked position and an unlocked position, the locking assembly including (i) a first locking component that includes a locking bar that is coupled to the movable support member, the locking bar having a first end, a second end, a pair of side segments and a middle segment that extends between and connects to each of the side segments, and (ii) a second locking component that includes a pair of locking apertures formed within at least one of the other of the fixed support member and the movable support member, and wherein each of the first end and the second end of the locking bar extend through one of the locking apertures when the locking assembly is in the locked position;
   wherein when the locking assembly is in the locked position, the movable support member is substantially inhibited from moving relative to the fixed support member to selectively adjust the tilt angle;
   wherein the locking assembly is only movable between the locked position and the unlocked position when the movable support member is in the first position relative to the fixed support member; and
   wherein the second mover end is coupled to the middle segment of the locking bar between the slotted apertures.

4. The solar panel support assembly of claim 3 wherein the slotted apertures each include a first locking end and a second unlocking end; wherein when the locking assembly is in the locked position, the middle segment of the locking bar is at the first locking end of the slotted apertures; and wherein when the locking assembly is in the unlocked position, the middle segment of the locking bar is at the second unlocking end of the slotted apertures.

5. A solar panel support assembly for movably supporting a solar panel relative to a surface of a vehicle, the solar panel support assembly comprising:
   a fixed support member that is fixedly coupled to the surface;

a movable support member that is configured to retain the solar panel, the movable support member being movably coupled to the fixed support member;

a locking assembly that is movable between a locked position and an unlocked position, wherein when the locking assembly is in the locked position, the movable support member is substantially inhibited from moving relative to the fixed support member; and a linear actuator that (i) moves the movable support member relative to the fixed support member between a first position and a second position, and (ii) moves the locking assembly between the locked position and the unlocked position in a direction that is non-perpendicular to a direction of movement of the linear actuator;

wherein at least a portion of time the linear actuator moves only one of (i) the movable support member relative to the fixed support member between the first position and the second position, and (ii) the locking assembly between the locked position and the unlocked position.

6. The solar panel support assembly of claim 5 wherein the locking assembly is only movable between the locked position and the unlocked position when the movable support member is in the first position relative to the fixed support member.

7. The solar panel support assembly of claim 5 wherein the linear actuator moves the movable support member to adjust a tilt angle of the movable support member relative to the fixed support member between the first position and the second position.

8. The solar panel support assembly of claim 7 further comprising a mover assembly that rotates the movable support member relative to the fixed support member.

9. The solar panel support assembly of claim 5 wherein the movable support member includes a top edge, an opposed bottom edge, a first side edge, and an opposed second side edge; wherein when the movable support member is in the first position, a plurality of the top edge, the bottom edge, the first side edge and the second side edge of the movable support member are positioned substantially adjacent to the fixed support member; and wherein when the movable support member is in the second position, substantially the entire top edge, first side edge and second side edge of the movable support member are spaced apart from the fixed support member.

10. The solar panel support assembly of claim 5 wherein the locking assembly includes (i) a locking bar that is coupled to the movable support member, the locking bar having a first end and a second end, and (ii) a pair of locking apertures formed within the fixed support member, and wherein each of the first end and the second end of the locking bar extend through one of the locking apertures when the locking assembly is in the locked position.

11. The solar panel support assembly of claim 10 wherein the movable support member includes a top edge, an opposed bottom edge, a first side edge, an opposed second side edge, and an inner support bracket that is coupled to and extends between the top edge and the bottom edge between the first side edge and the second side edge; and wherein the linear actuator has a first mover end that is coupled to the fixed support member, and a second mover end that is coupled to the inner support bracket.

12. The solar panel support assembly of claim 11 wherein the inner support bracket includes a pair of spaced apart slotted apertures; wherein the locking bar includes a pair of side segments and a middle segment that extends between and connects to each of the side segments; and wherein the second mover end is coupled to the middle segment of the locking bar between the slotted apertures.

13. The solar panel support assembly of claim 12 wherein the slotted apertures each include a first locking end and a second unlocking end; wherein when the locking assembly is in the locked position, the middle segment of the locking bar is at the first locking end of the slotted apertures; and wherein when the locking assembly is in the unlocked position, the middle segment of the locking bar is at the second unlocking end of the slotted apertures.

14. A solar panel support assembly for movably supporting a solar panel relative to a surface of a vehicle, the solar panel support assembly comprising:

a fixed support member that is fixedly coupled to the surface;

a movable support member that is configured to retain the solar panel, the movable support member being movably coupled to the fixed support member, the movable support member including an inner support bracket that includes a pair of spaced apart slotted apertures;

a locking assembly that is movable between a locked position and an unlocked position, wherein when the locking assembly is in the locked position, the movable support member is inhibited from moving relative to the fixed support member, the locking assembly including (i) a first locking component that includes a locking bar that is coupled to the movable support member, the locking bar having a first end, a second end, a pair of side segments, and a middle segment that extends between and connects to each of the side segments, and (ii) a second locking component that includes a pair of locking apertures formed within the fixed support member, and wherein the first end of the locking bar extends through one of locking apertures of the pair of locking apertures, and the second end of the locking bar extends through the other locking apertures of the pair of locking apertures when the locking assembly is in the locked position; and a mover that moves the movable support member relative to the fixed support member between a first position and a second position, the mover having a first mover end that is coupled to the fixed support member, and a second mover end that is coupled to the inner support bracket, and wherein the second mover end is coupled to the middle segment of the locking bar between the slotted apertures.

15. The solar panel support assembly of claim 14 wherein the locking assembly is only movable between the locked position and the unlocked position when the movable support member is in the first position relative to the fixed support member.

16. The solar panel support assembly of claim 14 wherein the mover moves the locking assembly between the locked position and the unlocked position.

17. The solar panel support assembly of claim 14 wherein the mover includes a linear actuator that (i) moves the movable support member relative to the fixed support member between a first position and a second position, and (ii) moves the locking assembly between the locked position and the unlocked position.

18. The solar panel support assembly of claim 14 wherein the movable support member further includes a top edge, an opposed bottom edge, a first side edge, and an opposed second side edge, wherein the inner support bracket is coupled to and extends between the top edge and the bottom edge between the first side edge and the second side edge, and wherein when the movable support member is in the first position, a plurality of the top edge, the bottom edge, the first side edge and the second side edge of the movable support member are positioned substantially adjacent to the fixed support member; and wherein when the movable support member is in the second position, substantially the entire top edge, first side edge and second side edge of the movable support member are spaced apart from the fixed support member.

19. The solar panel support assembly of claim 14 further comprising a hinge that movably couples the movable support member to the fixed support member, and wherein when the mover moves the movable support member relative to the fixed support member, the mover adjusts a tilt angle between the movable support member and the fixed support member between the first position and the second position.

20. The solar panel support assembly of claim 14 further comprising a second mover that rotates the movable support member relative to the fixed support member.

21. The solar panel support assembly of claim 14 further comprising a remote control device that wirelessly controls the mover assembly and the locking assembly.

22. The solar panel support assembly of claim 14 wherein the slotted apertures each includes a first locking end and a second unlocking end; wherein when the locking assembly is in the locked position, the middle segment of the locking bar is at the first locking end of the slotted apertures; and wherein when the locking assembly is in the unlocked position, the middle segment of the locking bar is at the second unlocking end of the slotted apertures.

* * * * *

UNITED STATES PATENT AND TRADEMARK OFFICE
CERTIFICATE OF CORRECTION

PATENT NO. : 9,718,334 B2
APPLICATION NO. : 15/090068
DATED : August 1, 2017
INVENTOR(S) : Kevin Paul Means It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Please replace FIGS. 1-9 with FIGS. 1-9 as shown on the attached pages.

Signed and Sealed this
Ninth Day of June, 2020

Andrei Iancu
*Director of the United States Patent and Trademark Office*

(12) United States Patent
Means

(10) Patent No.: US 9,718,334 B2
(45) Date of Patent: Aug. 1, 2017

(54) ASSEMBLY AND METHOD FOR SUPPORTING AND LOCKING MOVABLE SOLAR PANELS

(71) Applicant: Kevin Paul Means, Lakeside, CA (US)

(72) Inventor: Kevin Paul Means, Lakeside, CA (US)

(*) Notice: Subject to any disclaimer, the term of this patent is extended or adjusted under 35 U.S.C. 154(b) by 0 days.

(21) Appl. No.: 15/090,068

(22) Filed: Apr. 4, 2016

(65) Prior Publication Data
US 2016/0297287 A1  Oct. 13, 2016

Related U.S. Application Data

(60) Provisional application No. 62/145,317, filed on Apr. 9, 2015.

(51) Int. Cl.
*B60J 7/16* (2006.01)

(52) U.S. Cl.
CPC .................... *B60J 7/1642* (2013.01)

(58) Field of Classification Search
CPC .................................... B60J 7/1642
USPC ........ 296/211, 100, 4, 100.07; 224/301, 315, 224/321
See application file for complete search history.

(56) References Cited

U.S. PATENT DOCUMENTS

| | | |
|---|---|---|
| 948,737 A | 2/1910 | McKee et al. |
| 3,990,277 A | 11/1976 | Mullich |
| 4,789,197 A * | 12/1988 | Lewis ............ B60J 7/041 296/100.04 |
| 4,891,908 A | 1/1990 | Aquilina |
| 4,934,800 A | 6/1990 | Choi |
| 5,350,213 A * | 9/1994 | Bernardo ........... B60J 7/041 160/133 |
| 5,379,753 A | 1/1995 | Noennich |
| 5,725,062 A | 3/1998 | Fronek |
| 6,125,583 A | 10/2000 | Murray et al. |
| 6,273,174 B1 | 8/2001 | Singleton |
| 6,382,005 B1 | 5/2002 | White et al. |

(Continued)

FOREIGN PATENT DOCUMENTS

| | | |
|---|---|---|
| EP | 2318625 B1 | 3/2013 |
| WO | WO2012079004 A1 | 6/2012 |

OTHER PUBLICATIONS

Go Power Adjustable RV rack for 55,80,110 RV Kits http://www.altestore.com/store/Solar-Panel-Mounts-Trackers/RV-Specialty-Solar-Panel-Mounts/Go-Power-Adjustable-RV-rack-for-5580110-RV-KITS/p597/?gclid=CLvxvdyNnsQCFQaTfgodKBsAIQ.

*Primary Examiner* — Dennis H Pedder
(74) *Attorney, Agent, or Firm* — Roeder & Broder LLP; James P. Broder

(57) ABSTRACT

A solar panel support assembly (12) for movably supporting a solar panel (10) relative to a surface (22) of a vehicle (624) comprises a fixed support member (14), a movable support member (16), and a locking assembly (20). The fixed support member (14) is fixedly coupled to the surface (22). The movable support member (16) is configured to retain the solar panel (10), the movable support member (16) being movably coupled to the fixed support member (14). The locking assembly (20) is movable between a locked position and an unlocked position. When the locking assembly (20) is in the locked position, the movable support member (16) is substantially inhibited from moving relative to the fixed support member (14). The solar panel support assembly (12) can further comprise a mover assembly (18) that moves the movable support member (16) relative to the fixed support member (14).

22 Claims, 6 Drawing Sheets